(12) United States Patent
Jin et al.

(10) Patent No.: US 10,448,326 B2
(45) Date of Patent: Oct. 15, 2019

(54) METHOD AND DEVICE FOR ROUTING AND SCHEDULING IN A MULTI-HOP NETWORK

(71) Applicant: Kabushiki Kaisha Toshiba, Tokyo (JP)

(72) Inventors: Yichao Jin, Bristol (GB); Usman Raza, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 25 days.

(21) Appl. No.: 15/355,287

(22) Filed: Nov. 18, 2016

(65) Prior Publication Data
US 2018/0146489 A1    May 24, 2018

(51) Int. Cl.
*H04W 52/02* (2009.01)
*H04W 40/00* (2009.01)
(Continued)

(52) U.S. Cl.
CPC ........ *H04W 52/0216* (2013.01); *H04B 7/022* (2013.01); *H04W 40/00* (2013.01);
(Continued)

(58) Field of Classification Search
CPC ............. H04W 72/082; H04W 5/0037; H04W 72/0413; H04W 72/042; H04W 72/048; H04W 72/1231; H04W 72/1268
See application file for complete search history.

(56) References Cited

U.S. PATENT DOCUMENTS

| | | | | |
|---|---|---|---|---|
| 2002/0151276 | A1* | 10/2002 | Ito | H04W 24/00 455/41.1 |
| 2004/0263330 | A1* | 12/2004 | Alarcon | G08B 5/006 340/539.23 |

(Continued)

FOREIGN PATENT DOCUMENTS

| | | |
|---|---|---|
| JP | 2015-104013 A | 6/2015 |
| WO | WO 2012/073578 A1 | 6/2012 |

(Continued)

OTHER PUBLICATIONS

Wang, Q., et al., "6top Protocol (6P)", Internet-Draft Retrieved from http://tool.ietf.org/html/draft-ietf-6tishch-6top-protocol-03 (Oct. 31, 2015).

(Continued)

*Primary Examiner* — Ronald B Abelson
(74) *Attorney, Agent, or Firm* — Finnegan, Henderson, Farabow, Garrett & Dunner, L.L.P.

(57) ABSTRACT

There is provided a wireless device and a method for managing a wireless device for wireless transmission over a multi-hop wireless network, the wireless device comprising a wireless interface and a controller. A schedule of timeslots for transmitting and timeslots for receiving messages is determined based on which layer of the network the wireless device occupies. A transmission from a first node is received during a scheduled timeslot for receiving messages, the transmission comprising a message. The message is added to a queue of messages. In response to a signal being received via the wireless interface indicating that another node in the network has received the message, the message is removed from the queue of messages. During a scheduled timeslot for transmitting messages, at least one message from the queue of messages is transmitted to nodes in a layer closer to the sink than the wireless device.

20 Claims, 20 Drawing Sheets

(51) Int. Cl.
   *H04W 72/12* (2009.01)
   *H04B 7/022* (2017.01)
   *H04W 84/18* (2009.01)
   *H04L 5/00* (2006.01)

(52) U.S. Cl.
   CPC ....... *H04W 72/1205* (2013.01); *H04L 5/0091* (2013.01); *H04W 84/18* (2013.01); *Y02D 70/00* (2018.01); *Y02D 70/142* (2018.01); *Y02D 70/144* (2018.01); *Y02D 70/166* (2018.01); *Y02D 70/22* (2018.01)

(56) References Cited

U.S. PATENT DOCUMENTS

| | | | |
|---|---|---|---|
| 2007/0071005 A1* | 3/2007 | Mayhew | H04L 1/1838 370/392 |
| 2008/0181101 A1 | 7/2008 | Oh et al. | |
| 2008/0219286 A1* | 9/2008 | Ji | H04L 12/413 |
| 2008/0225774 A1* | 9/2008 | Kim | H04L 5/0037 370/315 |
| 2013/0182621 A1 | 7/2013 | Yagyu | |
| 2015/0023205 A1 | 1/2015 | Vasseur et al. | |
| 2015/0372717 A1* | 12/2015 | Schrum | H04B 3/542 |
| 2017/0196000 A1* | 7/2017 | Tujkovic | H04W 72/046 |
| 2018/0007714 A1 | 1/2018 | Yoshimura et al. | |

FOREIGN PATENT DOCUMENTS

| | | |
|---|---|---|
| WO | WO 2016/014331 A1 | 1/2016 |
| WO | WO 2016/111264 A1 | 7/2016 |
| WO | WO 2017/037403 A1 | 3/2017 |

OTHER PUBLICATIONS

Doddavenkatappa, M., et al., "Splash: Fast Data Dissemination with Constructive Interference in Wireless Sensor Networks", 10$^{th}$ USENIX Symposium on Networked Systems Design and Implementation, USENIX Association, (NSDI'13) (2013).

Dujovne, D., et al., "6TISCH: Deterministic IP-Enabled Industrial Internal (Of Things)", IEEE Communications Magazine Communications Standards Supplement, vol. 52, No. 12, pp. 36-41 (2014).

Duquennoy, S., et al., "Orchestra: Robust Mesh Networks Through Autonomously Scheduled TSCH", 13$^{th}$ ACM Conference on Embedded Networked Sensor Systems, SenSys'15, (2015).

Duquennoy, S., "Let the Tree Bloom: Scalable Opportunistic Routing with ORPL", 11$^{th}$ ACM Conference on Embedded Networked Sensor Systems, Sensys'13 (2013).

Landsiedel, O., et al. "Low Power, Low Delay: Opportunistic Routing meets Duty Cycling", Information Processing in Sensor Networks (IPSN), 2012 ACM/IEEE 11$^{th}$ International Conference, ACM 978-1-4503-1227 (2012).

Palattella, M.R., "On Optimal Scheduing in Duty-Cycled Industrial IoT Applications Using IEEE802.15.4e TSCH", IEEE Sensors Journal, vol. 13, No. 10, pp. 3655-3666 (2013).

Mohammad, M., et al., "Oppcast: Exploiting Spatial and Channel Diversity for Robust Data Collection in Urban Environments", 15$^{th}$ ACM/IEEE International Conference on Infromation Processing in Sensor Networks (IPSN), IEEE (Apr. 1, 2016).

Chatterjee, P., et al., "A Cross-Layer Distributed TDMA Scheduling for Data Gathering with MinimumLatency in Wireless Sensor Networks", 2009 Wireless VITAE 2009, 1$^{st}$ International Conference on Aalborg, IEEE, 978-1-4244-4067, pp. 813-187 (2009).

Winter, T., et al., "RPL: IPv6 Routing Protocol for Low-Power and Lossy Networks", Internet Engineering Task Force (IETF), Request for Comments: 6550, Retrieved from http://www.ietf.org/rfc/rfc6550.txt (2012).

Jin, Yichao, et al., "A Centralized Scheduling Algorithm for IEEE 802. 15.4e TSCH based Industrial Low Power Wireless Networks", IEEE Wireless Communication and Networking Conference (WCNC), IEEE, 978-1-4673-9814 (Apr. 1, 2016).

Vilajosana et al., "Minimal IPv6 over the TSCH Mode of IEEE 802.15.4e (6TiSCH) Configuration," Internet Engineering Task Force (IETF) (May 2017), pp. 1-28.

* cited by examiner

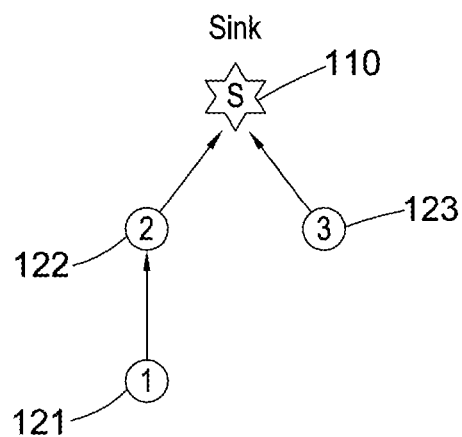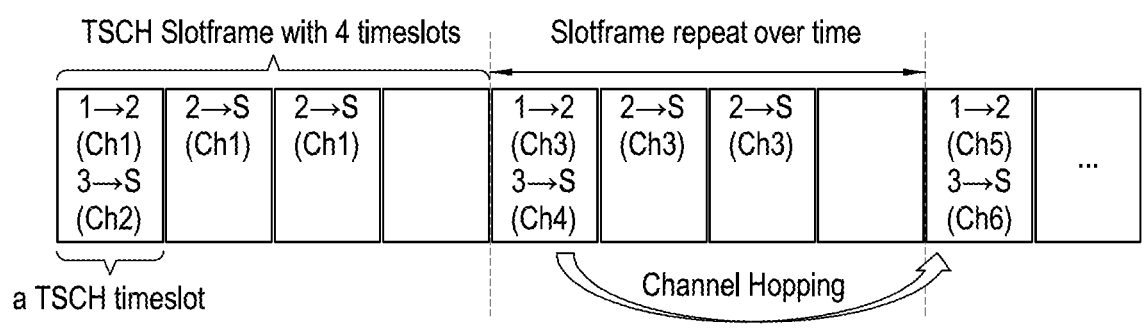
Fig. 1

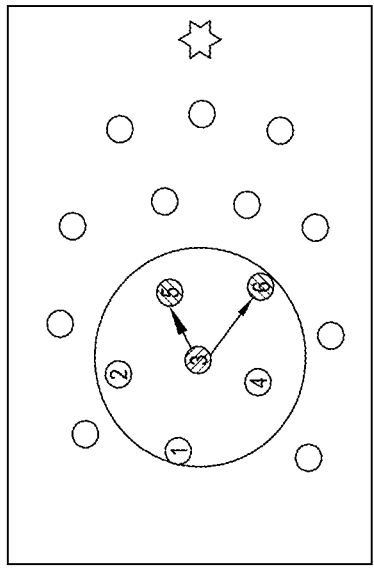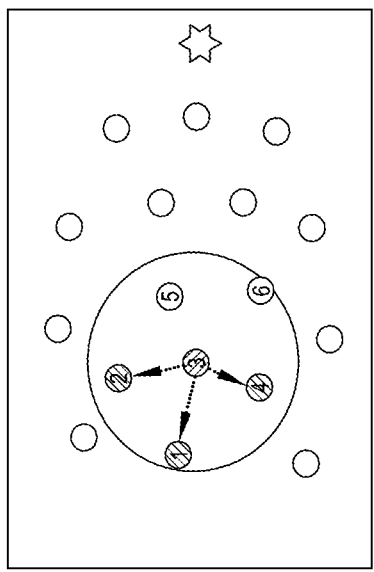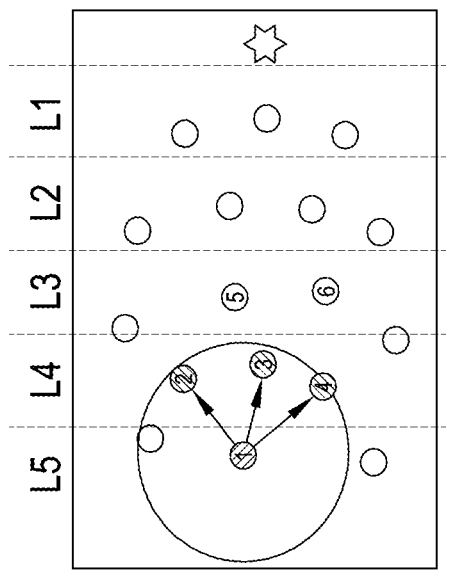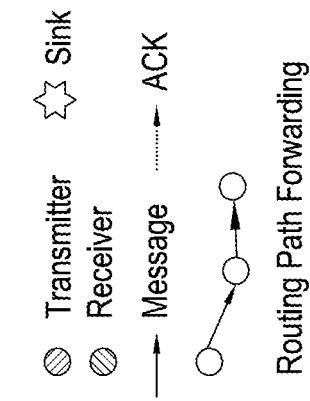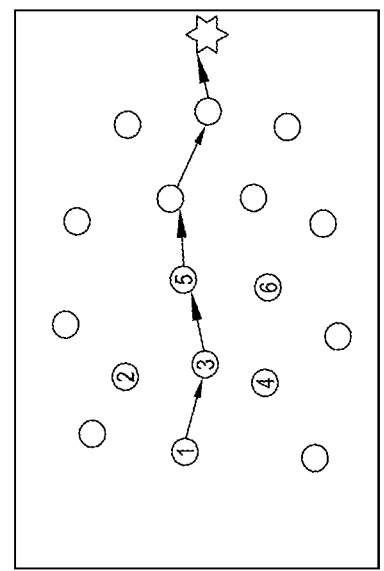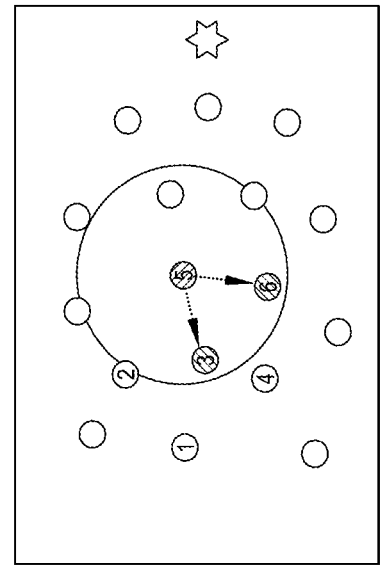

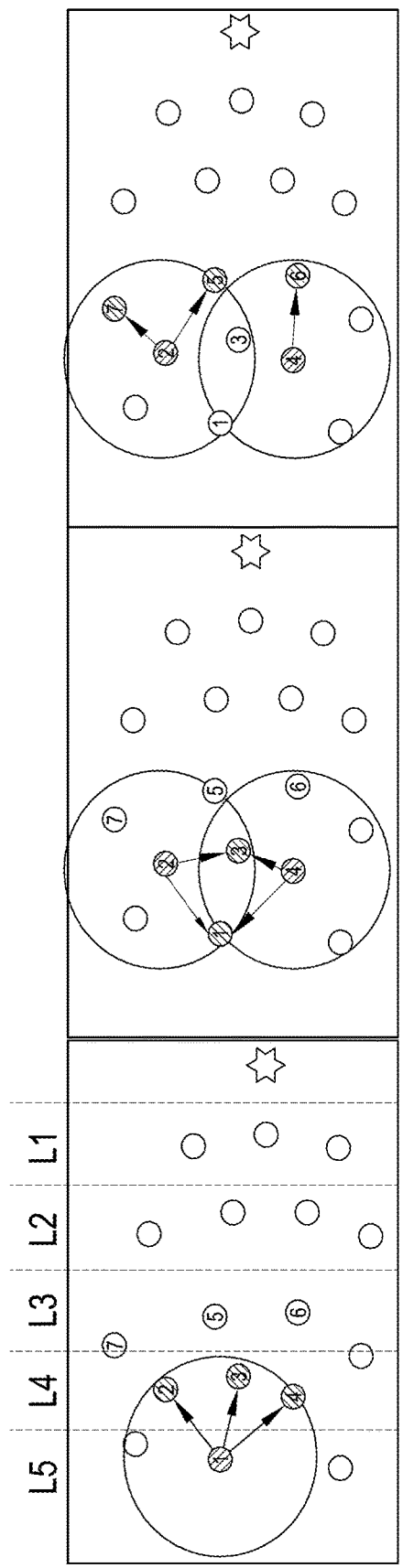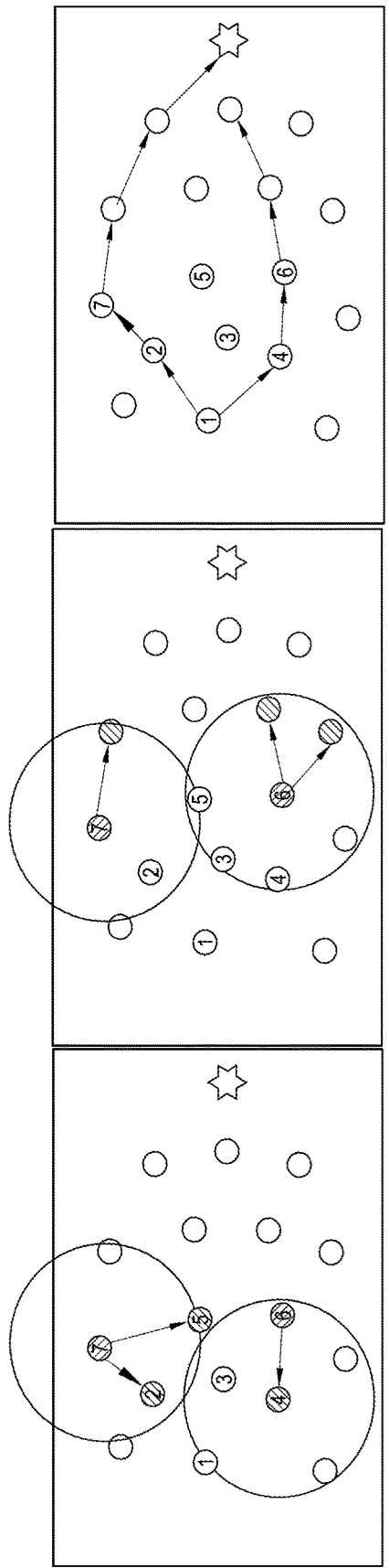
Fig. 4A  Fig. 4B  Fig. 4C  Fig. 4D  Fig. 4E  Fig. 4F

METHOD AND DEVICE FOR ROUTING AND SCHEDULING IN A MULTI-HOP NETWORK

TECHNICAL FIELD

The present disclosure relates to devices and methods for wireless transmission over multi-hop wireless networks.

BACKGROUND

Low latency and high reliability have always been the key requirements for industrial applications such as factory automation, power and energy system monitoring and control, smart metering, and oil and gas businesses. In the past, such industrial control systems have included a large number of cables in order to connect, monitor and control the array of devices and sensor units across an industrial plant. It can be quite expensive to install, operate and maintain such a wired system. Despite these disadvantages, the industry is still reluctant to switch to cheaper wireless internet of things (loT) solutions which have been on the market for the past few years.

The IEEE 802.15.4 standard specifies the physical layer and media access control (MAC) layer for low-rate wireless personal area networks, such as those used in industrial applications. Previous IEEE 802.15.4 standard solutions, whilst being cheaper, have not been able to deliver the desired low-latency and high reliability requirements due to their carrier sense multiple access with collision avoidance (CSMA/CA) based contention MAC access methods.

Time Division Multiple Access (TDMA) scheduling is an alternative to CSMA/CA. TDMA splits time into small intervals called timeslots. Each individual node in the network is assigned with a schedule (a set of timeslots), in which they can transmit data on a channel (e.g. a certain frequency bandwidth) without collision with other transmissions. Since TDMA is contention-less and collision free, it can achieve much lower multi-hop latency and higher communication reliability compared with CSMA/CA based approaches. Having said this, it still suffers from multi-path fading and interference from other devices in the Industrial, Scientific and Medical Radio (ISM) band such as WiFi, Bluetooth and microwave devices, to name a few.

To overcome these limitations, the Time-Slotted Channel Hopping (TSCH) MAC provides a promising way to enable deterministic mesh networking and paves the way for future low-power wireless industrial applications (the Internet of Important things). TSCH achieves improved communication reliability via channel hopping and avoids external interference operating at the same frequency band. Channel hopping helps to spread the risk of collisions by periodically switching the channel over which transmissions are made. TSCH also maintains low radio duty cycle and low energy consumption by synchronizing network nodes.

The Internet Protocol version 6 over the TSCH MAC (6TiSCH) standard is a developing Internet Engineering Task Force (IETF) standard. Along with a scheduling mechanism to enable deterministic wireless communication, it can provide ultra-low latency and high reliability guarantee for industrial applications.

Conventionally, in a 6TiSCH network, to ensure a deterministic communication, each scheduled communication link has one transmitter and one receiver. In addition, there is a dedicated routing path and each communication link along the routing path needs to be scheduled according to the multi-hop link traffic. The scheduler therefore needs to decide explicitly which node should transmit or receive on which channel at which timeslot.

The general rule is that a node should not transmit or receive at the same time or receive multiple messages designated to it at the same time. Secondly, interference may also occur when multiple communications take place at the same time within interference range of each other. Scheduling is therefore used in order to avoid all such conflicts.

Having said this, scheduling can be a rather complex process, which can incur additional delays and consume more resources for control overheads. This can also impose several limitations. A network with a tightly scheduled communication can be especially vulnerable to network dynamicity such as variable traffic rates, node failure and node mobility.

There is therefore a need to improve scheduling and provide spatial diversity to the TSCH MAC standard, which can greatly improve communication reliability and significantly reduce the re-scheduling complexity even when the nodes are mobile.

BRIEF DESCRIPTION OF THE DRAWINGS

Arrangements of the present invention will be understood and appreciated more fully from the following detailed description, made by way of example only and taken in conjunction with drawings, in which:

FIG. 1 shows an example of a multi-hop network utilising TSCH and a schedule for transmissions across the network;

FIGS. 3A-3E show the formation of a single opportunistic routing path utilising acknowledgements;

FIGS. 4A-4F show the formation of multiple opportunistic routing paths utilising acknowledgements;

DETAILED DESCRIPTION

Figure 2:
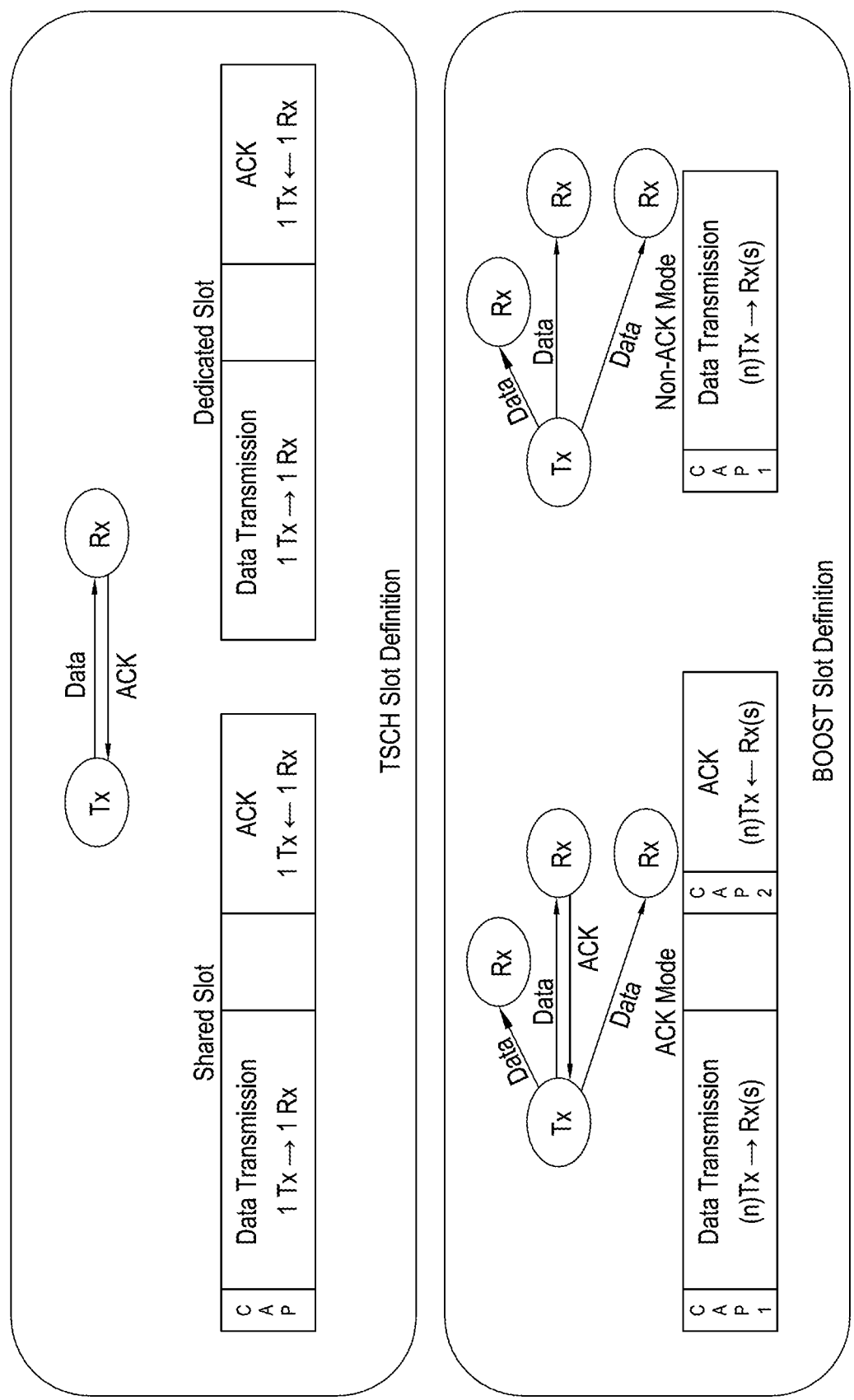
FIG. 2 shows a comparison between the scheduling in TSCH and the scheduling implemented in an arrangement.

According to a first arrangement there is provided a wireless device for wireless transmission over a multi-hop wireless network, the wireless network comprising nodes configured to forward messages towards a sink node, wherein the nodes are grouped in successive layers, each layer representing the distance of the nodes in the layer from the sink node. The wireless device comprises a wireless interface for wirelessly communicating with nodes in the network and a controller configured. The controller is configured to: determine a schedule of timeslots for transmitting and timeslots for receiving messages based on which layer the wireless device occupies; receive, via the wireless interface and during a scheduled timeslot for receiving messages, a transmission from a first node, the transmission comprising a message; add the message to a queue of messages for transmission by the wireless device; in response to a signal being received via the wireless interface indicating that another node in the network has received the message, remove the message from the queue of messages; and, during a scheduled timeslot for transmitting messages, cause the wireless interface to transmit at least one message from the queue of messages for transmission to nodes in a layer closer to the sink than the wireless device.

This arrangement therefore provides means of communicating in a deterministic (scheduled) manner whilst also providing a distributed and opportunistic routing scheme that is able to adapt to changes to the routing topology quickly and efficiently. The wireless device may be one of a plurality of nodes in the network. Each node is able to determine whether it is scheduled to attempt to transmit or receive data according to the layer that it occupies. This may be indicated by layer ID. For instance, timeslots may be divided into alternating even and odd timeslots and even layers (layers with an even layer ID) may be scheduled to transmit during even timeslots and receive data during odd timeslots. Naturally the converse may apply where even layers are scheduled to transmit during odd timeslots and receive data during even timeslots. Due to the scheduling of timeslots for transmission and timeslots for reception, arrangements described herein are suitable for implementation a time slotted channel hopping (TSCH) wireless network.

The queue may be one final queue of messages for transmission or may also include an initial buffer the storing messages prior to addition to the final queue. Accordingly received messages may be added directly to the final queue for transmission and subsequently removed, or may be received and stored in the initial buffer and then added to a final queue after a given period in response to no signals being received that indicate that another node in the network has received the message. In this latter case, the queue can be considered to be made up of the buffer and the final queue, wherein receipt of a signal indicating that another node in the network has received the message results in the buffer being cleared. The at least one message from the queue (the message the transmission) may be the next message in the queue, for instance, the message that has occupied the queue for the longest. Alternatively the at least one message from the queue may be a message from the queue that has the highest priority.

In one arrangement, the wireless device is configured to only add messages to its queue if they originate from a node in a layer that is further away from the sink node than the wireless device.

The signal indicating that another node has received the message may also indicate that one or more other nodes have received the message. The signal indicating that another node has received the message does not necessarily indicate that the same copy of the message has been received by the other node and by the wireless device. The other node may instead have received a different transmission (possibly from a different node) that includes a copy of the same message that is included in the transmission from first node. Each message may be associated with a unique message identifier (message ID) that allows messages to be compared to determine whether they are equivalent.

The wireless interface may comprise a wireless transceiver (a combined wireless transmitter and receiver) or may comprise a receiver and a separate transmitter.

The layers in the network indicate the distance of the nodes from the sink. Higher layers indicate nodes that are further from the sink node than lower layers. The layers may be determined based on a minimum hop distance to the sink, ranks/link quality between nodes and/or any other gradient routing metric.

The controller may be configured to determine which layer that the wireless device occupies. Alternatively, the layer could be communicated to the wireless device by another device such as an anchor point or a centralised network management device.

In one arrangement the signal indicating that another node has received the message is a transmission from the other node comprising the message and/or an acknowledgement from the other node that the message has been received. Accordingly, the message may be removed from the queue if another transmission is overheard includes a message, or if an acknowledgement is overheard that the first message. Any acknowledgement and/or transmission may include a message ID that identifies the relevant message.

In a further arrangement the controller is configured to, during a scheduled timeslot for transmitting messages: determine whether, during a transmission contention period, a further transmission is received via the wireless interface; and in response to a further transmission being received during the transmission contention period, inhibiting transmission for the duration of the scheduled timeslot for transmitting messages. Accordingly, the wireless device may be configured to contend for transmission during a transmission contention period and back off if another node transmits for the wireless device.

In one arrangement the transmission contention period is based on one or more of a random number, a number of messages in the queue, a priority of the at least one message in the queue, or a communication link quality.

Basing the transmission contention period on a random number helps to avoid multiple nodes attempting to transmit at the same time. In one arrangement the transmission contention period is inversely proportional to the number of messages in the queue. This allows transmission priority to go to the busiest nodes.

In one arrangement the transmission contention period is inversely proportional to the priority of the at least one message in the queue (the message from which transmission is being attempted). This allows transmission priority to go to the most important messages. The priority of messages may be included in any transmissions containing the messages.

In one arrangement the transmission contention period is inversely proportional to the communication link quality. This allows transmission priority to go to the nodes that have the best communication links. The link quality may be the quality of communication links with nodes in the next layer down in the network.

In one arrangement the controller is configured to, during the scheduled timeslot for receiving messages and in response to the receipt of the transmission: determine whether, during an acknowledgement contention period after receipt of the message, any signals are received via the wireless interface that indicate that an additional node has received the transmission; in response to no signals being received, during the acknowledgement contention period, that indicate that an additional node has received the transmission, transmit to the first node, via the wireless interface, an acknowledgement of receipt of the transmission.

Accordingly, the wireless device may implement acknowledgement contention, wherein the node that wins acknowledgement contention is allowed to transmit the message on. The received message may be queued for transmission unless, during the acknowledgement contention period, an acknowledgement relating to that message is overheard. As mentioned above, an alternative arrangement includes initially buffering the message and then adding it to a final queue at the end of the acknowledgement contention period if no acknowledgements relating to the message overheard. In this case the queue includes the buffer and the final queue.

In one arrangement the acknowledgement contention period is based on one or more of a random value, the number of messages in the queue, a priority of a message in the queue, or a communication link quality. As with the transmission contention period, the random value helps to avoid multiple nodes issuing acknowledgement at the same time.

In one arrangement the acknowledgement contention period is proportional to the number of messages in the queue. This gives priority to nodes that are less busy, increasing the chance that they take on the message very transmission.

In one arrangement the acknowledgement contention period is inversely proportional to link quality. This gives priority to nodes that are better connected.

In one arrangement the acknowledgement contention period is proportional to the priority of the next message in the queue. This helps to route messages towards nodes that have less urgent other messages.

In one arrangement the determination during the acknowledgement contention period and the transmission of the acknowledgement are in response to a determination of whether the device is located an odd or even number of layers away from the sink. Accordingly, whether or not the wireless device implements acknowledgement contention may be based on the layer that the wireless device occupies. In one arrangement a hybrid mode is implemented, wherein the wireless device undergoes acknowledgement contention based on whether it occupies an odd or even layer in the network. For instance, the wireless device may implement acknowledgement contention if it occupies an even layer, and not implements acknowledgement contention if it occupies an odd layer, or vice versa.

In one arrangement the schedule comprises alternating timeslots for transmitting messages and timeslots for receiving messages. These may be alternating odd and even timeslots.

In one arrangement the schedule is based on whether the wireless device occupies a layer which is an odd or even number of layers away from the sink. The timeslots for receiving messages and the timeslots for transmitting messages may be assigned based on whether the wireless device occupies an odd or even layer (whether the wireless device is an even or odd number of layers away from the sink).

In one arrangement the controller is configured to determine a channel for transmission and/or a channel reception based on which layer the wireless device occupies. The controller may be configured to ensure that it implements the different transmission channel to neighbouring layers that are scheduled to transmit as a same time as the wireless device. The same may apply to the transmission channel for reception of messages. For instance, where layers are scheduled to transmit or receive based on whether they are odd or even layers, neighbouring odd layers and neighbouring even layers may be assigned different channels. The channel offsets may be based on the layer that the wireless device occupies and number of channels being used by the network (e.g. a channel reuse factor, m).

In one arrangement the controller is configured to set the channel for transmission based on a channel offset ($CH_{offset}$) calculated according to:

$$CH_{offset} = \left\lfloor \frac{LID}{2} \right\rfloor \% \ m + LID \ \%2 \text{ or}$$

$$CH_{offset} = \left\lfloor \frac{LID-1}{2} \right\rfloor \% \ m + (LID-1) \ \%2$$

depending on whether the wireless device is located an odd or even number of layers away from the sink, wherein LID represents the layer that the wireless device occupies and m represents the number of channels being used by the network. This ensures that neighbouring transmitting layers do not transmit on the same channel and therefore helps to avoid interference with the network.

In one arrangement the controller is configured to set the channel for reception based on a channel offset ($CH_{offset}$) calculated according to:

$$CH_{offset} = \left\lfloor \frac{LID+1}{2} \right\rfloor \% \ m + (LID+1) \ \%2 \text{ or}$$

$$CH_{offset} = \left\lfloor \frac{LID}{2} \right\rfloor \% \ m + (LID) \ \%2$$

depending on whether the wireless device is located an odd or even number of layers away from the sink, wherein LID represents the layer that the wireless device occupies and m represents the number of channels being used by the network. This ensures that neighbouring layers receiving messages do so over different channels to avoid interference.

In one arrangement the controller is configured to: store an indication of the message after transmission; compare a later received message to the indication of the message, to determine whether the later received message is a duplicate of the message; in response to determining that the later received message is a duplicate of the message, inhibit transmission of the later received message by the wireless device. This helps to avoid duplicate messages being sent across the network.

In one arrangement the controller is configured to: for any transmission that is overheard, store an indication of the respective message to which the transmission relates, compare a later received message to the indication of the message, to determine whether the later received message is a duplicate of the respective message; in response to determining that the later received message is a duplicate of the respective message, inhibit transmission of the later received message by the wireless device. This helps to avoid duplicate messages being sent across the network In one arrangement the controller is configured to: determine whether the wireless device occupies the last layer before the sink; in response to the wireless device occupying the last layer before the sink, request a last layer schedule from a central scheduler; and, in response to receiving the last layer schedule, communicate with the sink according to the last layer schedule. By specifically scheduling transmissions to the sink, collisions at the sink are avoided. This may be applied for the last layer only due to an increased risk of collisions due to reduction in spatial diversity. By only centrally scheduling this final layer, the number of nodes that need to be centrally scheduled can be kept relatively small to keep the complexity down. A greedy scheduling algorithm may be applied based on average traffic rate for each node.

In one arrangement the controller is configured to: in response to the wireless interface detecting no transmissions during two consecutive scheduled timeslots for receiving messages, powering down the wireless interface during the following n scheduled timeslots for receiving messages to conserve energy, wherein n is a positive integer. This allows the wireless device to implement duty cycling to reduce power consumption when the network is not busy.

Powering down the wireless interface may form part of the wireless device being put into a low power (sleep) mode. This may include powering down one or more processes/modules in the controller, for instance the modules in charge of transmitting and receiving. The low power mode may be a low energy consumption mode wherein a number of power hungry modules are turned off. The wireless interface detecting no transmissions requires wireless interface to be powered on (further timeslots in which the wireless device enters the low-power mode are not scheduled during the low-power mode as the wireless interface is unable to make any determination regarding whether signals have or have not been received).

In one arrangement the controller is configured to: in response to no transmission being received during a scheduled timeslot for receiving messages, increase the number of scheduled timeslots for receiving messages during which the wireless interface is powered down by k, wherein k is a positive integer. Accordingly, the wireless interface may be powered down during multiple scheduled timeslots for receiving messages where messages are repeatedly not detected.

In one arrangement the controller is configured to, in response to the wireless interface detecting a transmission during a scheduled timeslot for receiving messages, reset the number of scheduled timeslots for receiving messages during which the interface is powered down to a default value. This default value may equal zero. Accordingly, a message is heard, the wireless device may reset and wake up to listen for transmissions during the following scheduled timeslot for receiving messages.

In one arrangement the controller is configured to: in response to the wireless interface detecting no transmissions during a scheduled timeslot for receiving messages, increase a probability of the wireless interface being powered down during a subsequent scheduled timeslot for receiving messages; and in response to the wireless interface detecting a transmission during a scheduled timeslot for receiving messages, decrease the probability of the wireless interface being powered down during subsequent timeslots receiving messages. Accordingly, instead of scheduling timeslots during which the wireless interface is powered down, a probability of powering down the wireless interface may be maintained, and increased where no messages are received. This probability may be implemented based on a threshold and a random number generated for each timeslot for receiving messages. If the random number is above the threshold, the wireless interface is powered down. If no messages are received then the threshold is reduced. If the message is detected during a timeslot for receiving messages then the probability/threshold may be reset to a default value.

In one arrangement the controller is configured to, during a scheduled timeslot for transmitting messages, in response to the queue containing no messages, powering down the wireless interface for the duration of the scheduled timeslot for transmitting messages. Accordingly, where no messages are due for transmission, the wireless device may power down the wireless interface, and any related modules, for the duration of the transmission timeslot to conserve power.

According to one arrangement there is provided a multi-hop wireless network comprising a plurality of wireless devices according to any of the above arrangements.

According to a further arrangement there is provided a method for managing a wireless device for wireless transmission over a multi-hop wireless network, the wireless network comprising nodes configured to forward messages towards a sink node, wherein the nodes are grouped in successive layers, each layer representing the distance of the nodes in the layer from the sink node, the wireless device comprising a wireless interface for wirelessly communicating with nodes in the network and a controller configured. The method comprises the controller: determining a schedule of timeslots for transmitting and timeslots for receiving messages based on which layer the wireless device occupies; receiving, via the wireless interface and during a scheduled timeslot for receiving messages, a transmission from a first node, the transmission comprising a message; adding the message to a queue of messages for transmission by the wireless device; in response to a signal being received via the wireless interface indicating that another node in the network has received the message, removing the message from the queue of messages; and, during a scheduled timeslot for transmitting messages, causing the wireless interface to transmit at least one message from the queue of messages for transmission to nodes in a layer closer to the sink than the wireless device.

Equally, further arrangements include methods that may be implemented by any of the above described wireless devices, to cause these devices to function as discussed.

In accordance with a further arrangement there is provided a computer readable medium comprising instructions that, when executed by a processor, cause the processor to enact any of the above methods. The computer readable medium may be a non-transitory computer readable medium such as NAND flash memory, a CD-ROM, or a magnetic hard drive.

Accordingly, arrangements blend opportunistic routing with TSCH to reduce the scheduling complexity, while reaping the benefits of receiver diversity of opportunistic forwarding and channel diversity of TSCH.

Time Slotted Channel Hopping (TSCH)

The IEEE 802.15.4e TSCH MAC is a time-slotted TDMA mechanism, where transmissions and receptions are carried out in each scheduled timeslot. In addition, channel-hopping adds frequency diversity, which statistically mitigates the effect of narrow-band interference and multi-path fading.

FIG. 1 shows an example of a multi-hop network utilising TSCH and a schedule for transmissions across the network. The wireless network comprises nodes 121, 122, 123 and a sink 110. Each node 121, 122, 123 is capable of communicating wirelessly with other nodes 121, 122, 123 (or the sink 110) within communication range. The sink 110 is also a wireless node, in that it is able to communicate wirelessly with nodes 121, 122, 123 within its transmission range. Each node 121, 122, 123 (including the sink 110) is assigned its own unique node identifier (node ID).

The sink 110 is effectively the ultimate destination for all communications. That is, all transmissions in the network are directed through the network towards the sink 110, which acts as a hub for all communications in the network. Transmissions are forwarded through the network by intermediate (relay) nodes 121, 122, 123 via a multi-hop system. The sink 110 receives the forwarded messages and may be able to perform processes based on the transmissions and/or can forward on the messages to a further device or network, e.g. via the internet.

In the routing topology shown in FIG. 1, dedicated communication links between nodes 121, 122, 123 or the hub 110 are shown as links between the respective nodes. The routing topology is calculated and a schedule is assigned in order to schedule the transfer of data from the nodes 121, 122, 123 towards the sink 110. Data packets are sent from outer nodes 123 to nodes 122, 123 closer to the sink 110, which in turn forward the data packets on to the sink 110 (if within range) or a further nodes. Each transmission from one node 121, 122, 123 to another is called a hop. The nodes 121, 122, 123 are divided up into layers based, for instance, on their minimum hop distance to the sink 110. The routing tree topology can be formed based on the shortest path to the sink 110, link quality (e.g. the Routing Protocol for Low-Power and Lossy Networks, RPL), load balancing or expected transmission count (ETX). The routing tree converges on the sink 110.

In the present example, a first node 121 is located on the outer edge of the network, second 122 and third nodes 123 are located further in the network and the sink 110 is located beyond the second 122 and third 123 nodes. The first node 121 has a communication link assigned to the second node 122 which in turn has a communication link with the sink 110. The third node 123 also has its own communication link with the sink 110. Each communication link is between only two nodes.

To avoid collisions between transmissions, a TDMA scheme is implemented. Accordingly, a schedule needs to be determined to specify when nodes 121, 122, 123 are permitted to transmit data.

The scheduler allocates cells to communication links or processing tasks over a particular scheduling period. A scheduling period is a period of time for which a schedule is to be defined, which will repeat over time. A scheduling period may be referred to as a frame or a slotframe. A slotframe is a standard unit of time determined by the scheduler, wherein a schedule defined for the slotframe is repeatedly executed over the scheduling period. Each slotframe is divided into a plurality of timeslots. The schedule assigns transmissions to the timeslots in the slotframe. Multiple transmissions can be assigned in each timeslot over various channels. A cell is a timeslot on a communications channel.

In the present arrangement, each slotframe has four timeslots. In the first timeslot a communication over a first channel is scheduled from the first node 121 to the second node 122. At the same time (in the first timeslot) a communication over a second channel is scheduled from the third node 123 to the sink 110. These simultaneous transmissions occur close to each other, which is why different channels are assigned to avoid interference. If the transmissions are sufficiently far apart from each other, then the same channel may be used.

In the second timeslot a transmission is scheduled over the first channel from the second node 122 to the sink 110. In the third timeslot a further transmission is scheduled over the first channel between the second node 122 and the sink 110. Each of these two transmissions may contain, for instance, the message that is being forwarded on from the first node 121 or a message generated by the second node 122. The fourth timeslot has no transmissions scheduled in it.

The present example implements channel hopping over time to avoid interference. If the channels are changed relatively frequently, then any interference between channels will only happy for a relatively short period of time. In the present example, the scheduled transmissions are the same (i.e. transmissions are scheduled during the same timeslots between the same nodes), but the channels change between slotframes. Accordingly, in the second slotframe, the transmissions that were previously over the first channel are made over a third channel. The transmissions that were previously over the second channel are made over a fourth channel. Equally, during the third slotframe, the transmissions that were previously over the third and fourth channels are made over fifth and sixth channels respectively.

By allocating specific timeslots for transmissions, TSCH provides a deterministic system that can ensure a specific level of reliability. Equally, as nodes know when transmissions may occur, they can be powered down when not needed. This provides a significant saving in power use. Having said this, for larger networks it can be computationally quite difficult to determine an appropriate routes and schedules. TSCH is therefore not particularly effective at adapting to changes in network topography or node failure.

Opportunistic Routing

Opportunistic Routing in Wireless sensor networks (ORW) and Opportunistic RPL (ORPL) exploit link diversity by opportunistically forwarding to any node that wakes up first and is closer to the sink. Both protocols are not specifically designed for TSCH based MAC but for asynchronous duty cycling MAC protocols. In asynchronous duty cycling protocols, as there are multiple potential forwarders that may wakeup at a given time to forward traffic, opportunistic link selection can be achieved. In contrast, TSCH scheduling schemes turn on precisely a single receiver per transmitter in a given time slot, making exploitation of link diversity a real challenge.

Arrangements discussed herein overcome this challenge by waking up multiple nodes based on their position within the network, giving rise to link diversity for TSCH based MAC protocols. In addition, arrangements introduce a prioritized channel access scheme to limit the number of duplicate copies of single message.

Channel Diversity and Hopping

Use of channel diversity is important to provide high reliability to industrial control applications. Channel diversity can be exploited in several contexts including fast data dissemination protocols from a single node to the rest of the network, and opportunistic routing protocols. Having said this, these schemes are not designed for TSCH based MAC and extending them for this purpose is non-trivial. 6TiSCH, on the other hand, provides native support for channel diversity and hopping for TSCH MAC that arrangements described herein leverage for highly reliable operation for industrial control applications.

TSCH Scheduling Schemes

TSCH scheduling may be implemented via centralized or distributed techniques. Centralization scheduling techniques collect information from the network at a central entity, compute a conflict-free schedule in an ideal scenario, and then disseminate this schedule back to nodes for its execution. These schedules perform very well in static network conditions. Any network changes due to link fluctuations or node mobility require re-computation of the schedule, incurring significant overheads. Moreover, at the onset of any change, channel resources are redistributed from previous routing paths to newly built paths. This usually leads to a sudden drop in the traffic reliability and an increase in end-to-end latency. Arrangements described herein are robust against such changes. By not relying on a single forwarding path, the network can quickly hop on a new forwarding path with minimal or no performance degradation.

Distributed scheduling schemes alleviate the problem of centralized scheduling schemes by making local and thus quicker scheduling decisions in case of any changes. Arrangements described herein utilise a fully-distributed and traffic-aware scheduling protocol that can adapt to any network changes and traffic types without need for any central entity. Thanks to its prioritized channel access scheme, the scheduling protocol can even reduce the end-to-end latency as well.

BOOST

Arrangements operate a scheduling mechanism for Bringing Opportunistic routing and effortless-Scheduling to TSCH (BOOST). BOOST is based on the IEEE 802.15.4e TSCH MAC.

Each node is assigned a layer ID based on the distance of the node from the sink. Each node then calculates its schedule based on which layer it occupies.

The main features of BOOST include:
1) BOOST offers layer level scheduling determinism, but it can be still comply with the TSCH MAC standard. It adopts traffic aware opportunistic routing within each layer. This brings sender and receiver spatial diversity into the picture to improve reliability without adding additional complexity to the scheduler. The proposed layer ID based multi-channel scheduling is very simple, which only requires one single parameter.
2) A contention mechanism within a synchronized time slot is utilised to exploit multipath and multiple receiver diversity, which is robust against bad channels and reduces retransmissions. Furthermore, the contention is priority and traffic aware, thereby allowing the effective scheduling and routing of messages.
3) BOOST supports bi-directional message exchange with and without acknowledgement to enhance reliability or to reduce slot length and latency, respectively.
4) An overhearing mechanism is provided to avoid inefficient network flooding.

Network Model and Routing Protocol

The network is divided into a number of layers, based on the distance of the nodes within the respective layer to the sink. Each node is assigned with a Layer ID (LID), representing the layer that it occupies. The layer ID can be defined based on geographical distance to the sink (e.g. minimal hop distance), represented by the ranks (Link quality) according to in the RPL protocol, and/or any other gradient routing metrics.

Layers can be assigned based on the minimum hop distance to the sink through the use of a "hello" message broadcast from the sink. At the beginning of network operation the sink can broadcast this message to nearby nodes. Each transmission of the message includes the layer ID of the transmitter. The sink node sends the initial message with a layer ID of zero. Each node that receives the message takes a note of the layer ID of the transmitter and sets its own layer ID to be one greater than that of the transmitter. The node then retransmits the message including its own layer ID. If the node receives more than one copy of the message, then it sets its layer ID to be one greater than the smallest layer ID that has been received. A stopping criterion may be implemented, for instance, by ensuring that each node forwards the message only once.

The value of LID for each node may be periodically updated during network operation via control signalling. For instance, "hello" messages may be periodically sent by the sink to allow the nodes in the network to determine their location within the network. Alternatively, or in addition, the nodes may keep track of their location via communication with anchor points designating boundaries. These anchor points may communicate with nodes that pass their respective boundary via a second communication method, for instance, near field communication (NFC) or radio-frequency identification (RFID), to inform the nodes that they have crossed the boundary and/or to assign the new layer ID to the nodes.

A simple LID based routing mechanism is adopted where nodes with a higher LID value only send messages to the nodes in the following layer with a smaller LID value.

BOOST MAC and Slot Structure

Arrangements utilise a time-slotted TDMA mechanism, similar to that discussed with regard to the IEEE 802.15.4e TSCH MAC (as shown in FIG. 1). In this mechanism, transmissions and receptions are carried out in assigned timeslots. In addition, channel-hopping adds frequency diversity, which statistically mitigates the effect of narrowband interference and multi-path fading.

FIG. 2 shows a comparison between the scheduling in TSCH and the scheduling implemented in an arrangement. In each timeslot of the TSCH MAC, a unicast communication is adopted between one transmitter (Tx) and one receiver (Rx) based on either a scheduled TSCH timeslot or CSMA/CA contention based shared timeslot.

During a shared timeslot, an initial contention access period (CAP) is scheduled. If the transmitter successfully obtains access to the channel, a transmission to the receiver is scheduled. The receiver then waits to receive an acknowledgement of receipt from the receiver.

During a dedicated timeslot, no contention access period is required as transmission is specifically scheduled for this timeslot. Accordingly, the transmission is scheduled and then the receiver waits to receive an acknowledgement from the receiver.

In the present arrangement, multiple senders with the same LID compete to access to the media based on a pseudo random transmission delay timer Dt during a first contention access period (CAP1). This is similar to the shared timeslot; however, only the nodes in a given layer will contend for access, as shall be discussed later. In addition, the delay timer includes various biases to prioritise, for instance, better communication links.

The transmitter with the lowest value of Dt in a neighbouring area is able to transmit first, while other nodes in the region back off once they sense that the channel is occupied and defer their own transmissions until the next scheduled timeslot. It is, however, possible to have n multiple transmitters transmit at the same time if they are hidden from each other.

Spatial diversity is utilised by broadcasting/multicasting messages to nearby nodes, rather than transmitting to one specific node. In the present arrangement, each node broadcasts messages from its layer to the nodes in the next layer that is closer to the data sink (i.e. the next layer below the layer of the transmitting node). This ensures that the messages always move closer to the sink, whilst also allowing opportunistic routing to be implemented.

Two mechanisms are proposed for the opportunistic routing: (1) acknowledgement (ACK) mode; and (2) non-Ack mode, as shown in FIG. 2. In ACK mode, a reception delay timer Dr, similar to the transmission delay timer Dt, is used during a second contention access period (CAP2) period, after a message has been transmitted. The receiver with the smallest Dr will send an acknowledgement of receipt back to the transmitter. When the other receivers detect this acknowledgement, they back-off and keep quiet.

By involving multiple receivers, the communication reliability can be greatly improved, depending on the node density. Therefore, providing that a network has a sufficient node density σ, the non-ACK mode is proposed. This removes all ACK features in a timeslot, which effectively reduces the slot length by ⅓ (around 3 ms in a total 10 ms TSCH timeslot).

Overhearing to Reduce Message Replicates

When broadcasting a message from layer k to layer k−1, it is inevitable that multiple copies of the same message could be received by the multiple receivers and could subsequently forward them to the next layer, resulting in inefficient network flooding. To avoid that, two overhearing mechanisms are proposed: Transmitter (Tx) Overhearing and Ack Overhearing.

Each node maintains a queue of messages for transmission. When a node is scheduled to transmit, and wins the transmission contention, it will transmit the next message in its queue. When a node receives a message from another node, it adds the message to its queue for transmission. Each transmission of a message (and each acknowledgement, if there are any) may contain a message ID for identifying the message to which the transmission relates.

In one arrangement the queue operates on a first in first out policy. Alternatively, each message may have its own associated priority level. Messages with a high priority may be moved to the front of the queue ahead of messages with a lower priority.

In Tx Overhearing, any node that loses the Tx contention during CAP1, will likely receive and overhear the message forwarded by node that wins the Tx contention. It then checks whether it has a copy of the received message in its queue (e.g. by comparing unique message IDs) and deletes the copy from the queue, if there is one.

Similarly, for Ack Overhearing, any node that loses the ACK contention during CAP2 will likely overhear the ACK message sent by the node that one the ACK contention. This will contain the message ID for identifying the message to which the acknowledgement relates. The node will compare the message ID in the acknowledgement to the message IDs of the messages in its queue and will remove the copy of the received message from its own buffer.

The above overhearing mechanisms allow receiver diversity to be implemented by transmitting to multiple nodes whilst mitigating the risk of duplicate messages being passed via different routes.

Tx Overhearing can be applied to either ACK mode or Non-ACK mode, while ACK Overhearing can only be used in the ACK mode.

Depending on which node wins the contention and its geographical location, a single opportunistic routing path can be formed, as illustrated in FIG. 3.

FIGS. 3A-3E show the formation of a single opportunistic routing path utilising acknowledgements. The network is divided up into layers based on the distance of the nodes from the sink. Each layer contains nodes that have a similar distance to the node (e.g. the same minimum hop distance).

A first node (Node 1) is located in a fifth (outer) layer (Layer 5). Node 1 initiates the transmission and broadcasts the message to Node 2, Node 3 and Node 4 located in the Layer 4 (FIG. 3A). Nodes 2, 3 and 4 add the message to their respective queues. In the present scenario, Node 3 wins the ACK contention and broadcasts an ACK message back to Node 1.

The ACK message is overheard by Node 2 and Node 4 (FIG. 3B) which check their queue, and, finding a duplicate of the message being acknowledged, delete the duplicate from their queues.

Similarly, when nodes in Layer 4 are able to transmit, the same process repeats itself. In present case, Node 3 wins the transmission contention and forwards the message to Node 5 and Node 6 in the Layer 3 as shown in (FIG. 3C). By using layer-by-layer opportunistic routing, the message will eventually reach the sink.

Since spatial diversity is utilised, it is possible to have multiple paths forwarding the same message if some of the relay nodes are hidden from each other. An example of this is shown in FIGS. 4A-4F.

FIGS. 4A-4F show the formation of multiple opportunistic routing paths utilising acknowledgements. As in FIG. 3A, Node 1 transmits to Nodes 2, 3 and 4 in Layer 4. In this case, Node 2 is assumed to have the smallest delay Dr to access to MAC and sends the ACK message first. Node 3 overhears the ACK message and deletes its copy of the message from its queue; however, since Node 4 is hidden from Node 2 (as they are located out of transmission range from each other), Node 4 will not overhear the ACK message from Node 2. Accordingly, Node 2 will not back off and will therefore also send an ACK message when its timer Dr expires shortly after. Therefore, both Node 2 and Node 4 would forward the message to the next layer and form two distinctive routing paths, which may be geographically separate from each other. This approach increases the routing spatial diversity, hence improving reliability without any additional control overheads.

To avoid nodes forwarding on messages that have already been forwarded on, each node will keep a track of the message ID for each message that is overheard or forwarded on by the node for a limited period of time. Accordingly each node stores a list of messages previously transmitted through the network. Each time a message is received, either through a transmission to the node or the node overhearing transmission between two other nodes in the network, an identifier of the message (such as a unique message ID) is stored in the list. In addition each time an acknowledgement is overheard, an identifier of the message to which the acknowledgement relates (such as a message ID) is stored in the list.

Each time a message is received, the message is compared to the messages identified in the list. If the received message is identified in the list of previously received messages, then the message is determined to be a duplicate. The message is therefore ignored and is not added to the queue of messages for transmission, is not forwarded on by the node, and is not acknowledged by the node. This ensures that a duplicated message that is later received (e.g. via a second, slower routing path) can be stopped, to prevent messages flooding the network to improve efficiency and to ensure that the fastest routes take priority. In the present scenario, one of the nodes in Layer 1 receives the message via a first path and forwards it on to the sink before a further node in Layer 1 receives a duplicate of the message via a second path. In this case, as this further node has overheard the transmission of the message to the sink, it ignores the duplicate message when it has been later received via the second route and therefore does not forward it onto the sink.

Slot Structure

Figure 5:
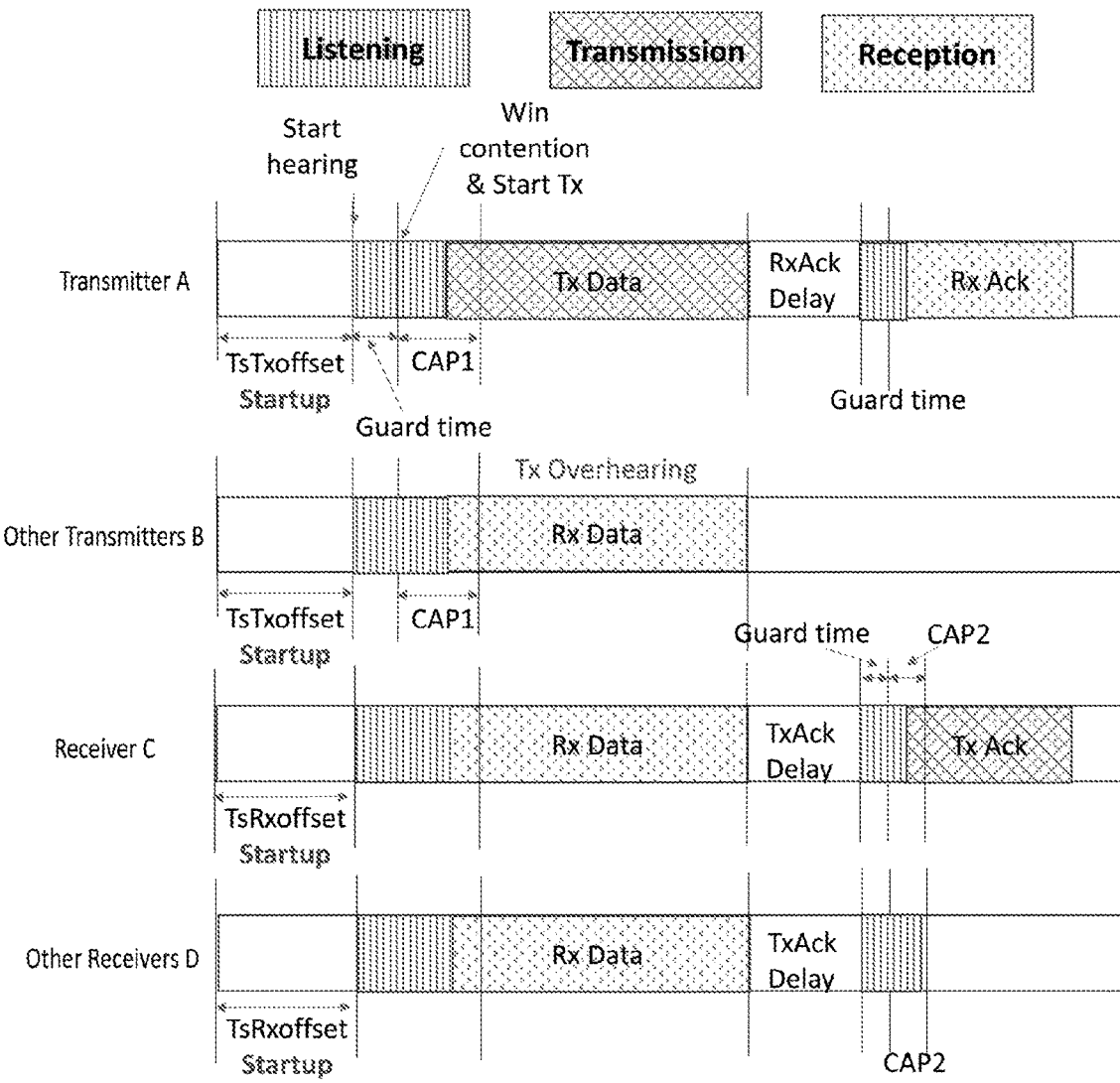
FIG. 5 shows the timeslot structure for the ACK mode with Tx overhearing.

FIG. 5 shows the timeslot structure for the ACK mode with Tx overhearing. Four timing scenarios are shown: transmitter A, relating to the node that wins transmission contention; other transmitters B, relating to the remaining transmitters in the region that lose transmission contention; receiver C, relating to the receiver that wins acknowledgement contention; and other receivers D, relating to the remaining receivers in the region that lose acknowledgement contention.

All of the timeslots begin with an initial period (TsTxoffset). After the TsTxoffset, a guard interval is scheduled to provide a buffer to allow time for all nodes scheduled for transmission to begin listening before transmission contention starts. After the guard interval, the transmitter nodes (the nodes in the layer scheduled for transmission) begin the transmission contention access period (CAP1). In the present scenario, transmitter A wins this contention as it has the shortest transmission delay Dt.

Once this transmission delay Dt has finished, as no other transmissions have been detected, transmitter A transmits the message to the receiver nodes (the nodes in the layer below the transmitter layer). The other transmitters overhear this transmission before their transmission delay has finished, and so back off. They overhear the message and delete any duplicates of this message that are present in their respective queues.

After transmission, transmitter A waits for an acknowledgement of receipt (as ACK mode is being implemented). The receivers wait for a buffer period (TxAckDelay) after the end of the transmission, followed by a guard time, and then begin acknowledgement contention. The TxAckDelay period provides time for the receiving nodes to process the received message before beginning acknowledgement contention. The guard time provides a buffer to allow all the receiving nodes time to finish processing the message and prepare for acknowledgement contention. During acknowledgement contention, each receiver waits for its own receiver delay Dr during the acknowledgement contention access period (CAP2). In the present scenario, receiver C has the shortest receiver delay and so wins the acknowledgement contention.

Once this receiver delay has finished, as no other acknowledgements have been overheard by receiver C, receiver C sends an acknowledgement back to transmitter A. The other receivers D overhear this acknowledgement and so back off, inhibiting any scheduled acknowledgements. The other receivers D will recognise the message ID of the acknowledgment as being the same as duplicate messages stored in their respective queues. The other receivers D will therefore delete these duplicates from their respective queues.

After transmitting the acknowledgement, receiver C will wait until the next scheduled timeslot for transmission and then attempt to transmit a message (e.g. the message it has just received) from its queue.

Figure 6:
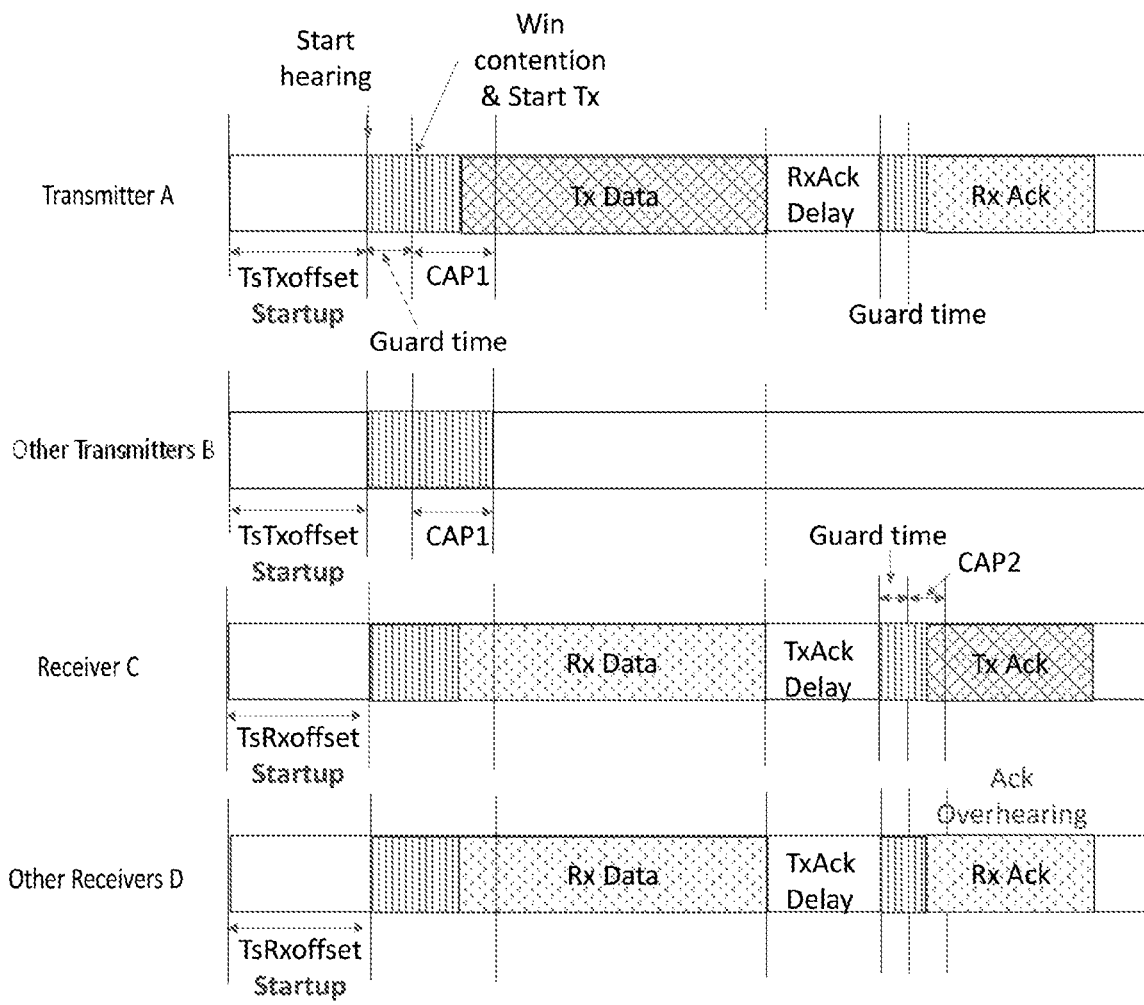
FIG. 6 shows the timeslot structure for the ACK mode with ACK overhearing.

FIG. 6 shows the timeslot structure for the ACK mode with ACK overhearing. As with FIG. 5, timeslot structures for transmitter A, other transmitters B, receiver C and other receivers D are shown. The scenario is the same as in FIG. 5; however, it can be seen that the other receivers D overhear the acknowledgement sent from receiver C. This causes the other receivers D to back off and remove any duplicate copies of the message from their queues.

Figure 7:
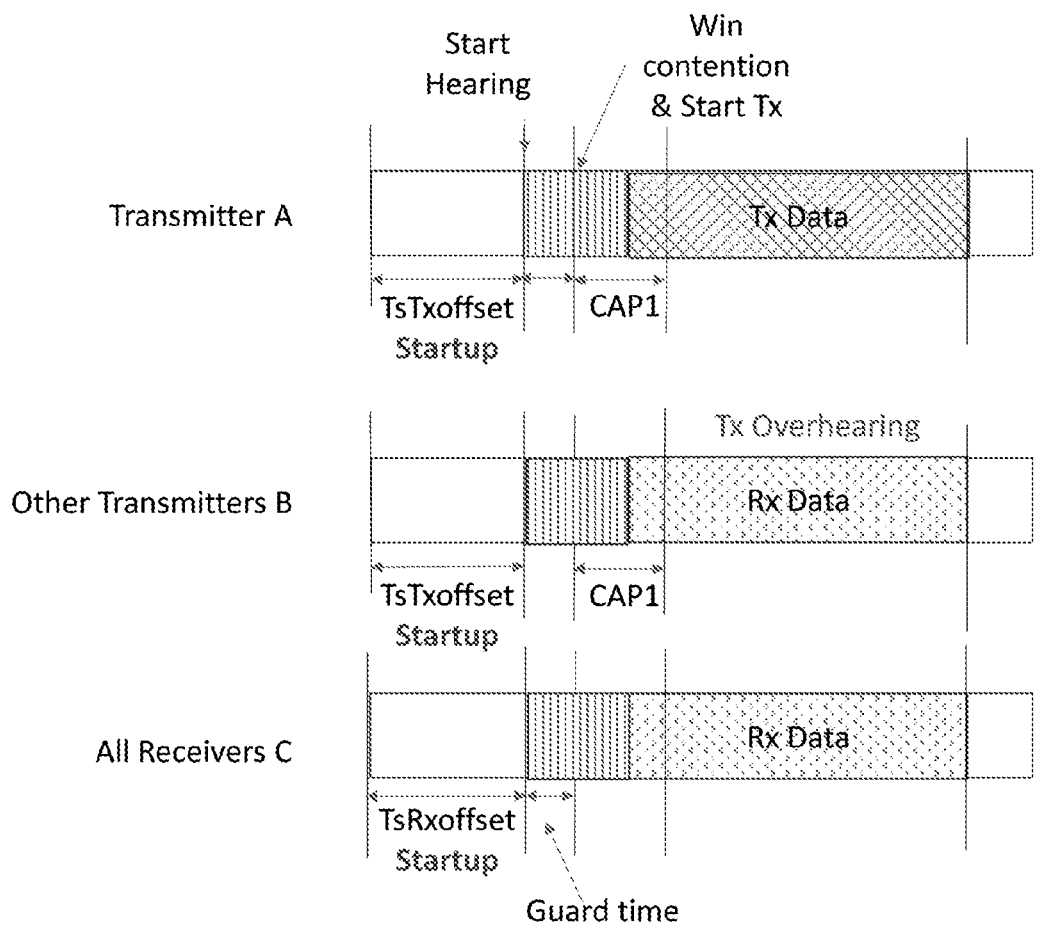
FIG. 7 shows the timeslot structure for non-ACK mode with Tx overhearing.

FIG. 7 shows the timeslot structure for non-ACK mode with Tx overhearing. Timeslot schedules are shown for a transmitter A, other transmitters B and all receivers C.

In non-ACK mode transmission occurs in the same manner as in ACK mode. Accordingly, the nodes begin the timeslot with an initial offset (TsTxoffset) and guard time before the nodes scheduled for transmission begin transmission contention access.

During the transmission contention access period (CAP1), transmitter A wins contention by having the shortest transmission delay Dt and so begins transmission. The other transmitters B overhear this transmission and back off, removing any duplicates of the transmitted message that may be present in their queues.

All nodes in the vicinity that are scheduled for reception (all receivers C) will overhear the transmission and receive the transmitted message. As no acknowledgement is required, there is no acknowledgement contention. Instead, all of the nodes wait until the next timeslot.

When the receivers C reach a timeslot in which they are scheduled for transmission, they will begin transmission contention as discussed above. The receiver that wins transmission contention will then send the next message in their queue. If this message is the message that was transmitted from transmitter A then the remaining receivers C will overhear this transmission and delete the message from their respective queues. Accordingly, non-ACK mode provides opportunistic routing without requiring any acknowledgement contention.

Priority and Queue Aware Transmission Delay

In the transmission contention access period (CAP1), each node in the same layer will wake up in the same timeslot and start to listen to the channel. The timing for each node to access the channel and start to transmit depends on a small transmission delay period Dt.

In one arrangement the transmission delay period is a function of a few parameters including packet priority P and runtime queue length Q as shown in (1):

$$Dt = f(P, Q) \quad (1)$$

One example of such function is illustrated as below, assuming there are three data priority categories and two queue length categories.

TABLE 1

Packet Priority mapping Table

| Priority | Low | Medium | High |
|---|---|---|---|
| P value | 600 μs | 400 μs | 200 μs |

TABLE 2

Queue length mapping table

| Queue Length | <10 packets | >= 10 packets |
|---|---|---|
| Q value | 1 | 2 |

$$Dt = f(P, Q) = rand(1, 10) + \frac{P}{Q} \quad (2)$$

As shown in Table 1, the packet priority value P represents a delay based on the priority of the packet that is queued for transmission. P decreases as the packet priority increases to reduce the delay and thereby make it more likely that high priority messages are sent.

In contrast, the Q value, representative of the number of messages queued for transmission at the given node, increases as the queue length increases. The Q value is one for queues of less than 10 packets and two for queues of greater than or equal to 10 packets.

A simple example of a transmission delay function is illustrated in (2), where rand(1,10) generates a random number from 1 to 10. The purpose of this random function is to avoid contention collision in case that nodes that have the same queue length attempt to transmit a message with the same priority.

Assuming that there are two nodes, node 1 and node 2, competing for access to a channel. Node 1 has a high priority message and a low queue and the rand function gives a value of 5. Hence Dt(1)=5+200/1=205 μs. On the other hand, Node 2 has a low priority message but a larger queue length. Assuming a random value of 2, Dt(2)=2+600/2=302 μs.

Both Node 1 and Node 2 will wake up at the beginning of the timeslot and listen to the channel. After 205 μs, Node 1 will begin to transmit since the channel is still idle. On the other hand, Node 2 has to wait for 302 μs until it can start to transmit. Before that Node 2 already detects that the channel is occupied by Node 1 and so Node 2 will back-off its own transmission.

The main benefit of such design is that, within the same layer, priority is given to the busiest nodes and the nodes with the most critical messages to deliver. By reducing the delay for more critical messages and reducing the delay for nodes with longer queue sizes, busier nodes and/or nodes with high priority messages will get a larger chance to access to the channel. This provides a more adaptive scheme under dynamic network conditions compared to conventional 6TiSCH scheduling based approaches, which require a considerable amount of time and signalling to re-allocate resources.

The transmission delay Dt can be based on one or more of the queue size, the message priority and the link quality.

ACK Delay Timer Dr

The acknowledgement (ACK) delay timer Dr, which decides which node sends the ACK message first during the acknowledgement contention access period (CAP2) can be based on similar parameters to Dt. Dr could be determined by the node queue size, with nodes with a larger queue having a larger Dr in order to avoid buffer overflow and traffic congestion.

Other parameters can also be used such as the link quality level and/or the priority of the next message in the queue for transmission. A random delay function could also be implemented to avoid ACK message collision.

The link quality can be indicated by the Received Signal Strength Indication (RSSI) of signals sent over a communication link, a Link Quality Indication (LQI) and/or an Expected Transmission Count (ETX). As each node in a layer is able to communicate with any node in the next layer down, the link quality is representative of the quality of the communication link between the node and the receiving nodes in the next layer down. The link quality may therefore be an average of individual link quality is between individual pairs of nodes. Dr is inversely proportional to the link quality. For instance, a larger ETX value represents a poorer link quality, hence a larger value of Dr.

In one arrangement, Dr is proportional to the priority of the next message in the queue. This means nodes with high priority messages are less likely to receive additional messages. This helps to redirect traffic from nodes have important messages to transmit.

Layer Based Distributed Scheduling

The scheduler in 6TiSCH is responsible for providing an optimized schedule for each individual communication link in the network. Based on some known or pre-collected network information, for instance, node traffic rate, link quality etc., a centralized scheduler can decide during which timeslot and on which channel each node should transmit or receive packets. However, the complexity of such a centralized scheduling algorithm could jump exponentially when the number of links increases; hence, it is not scalable.

In addition, a centralized scheduling mechanism may only be suitable for networks with predictable conditions, such as a static network with periodic traffic. Therefore, it may not be robust against network dynamicity, for example, variable traffic rates, uneven traffic load and link dynamicity.

A distributed scheduling approach can provide adaptability based on real-time reports on network conditions via local message changes. Nevertheless, local message gossiping to exchange resources might incur additional delays with limited adaptability to node mobility or changes in routing topology.

Figure 8:
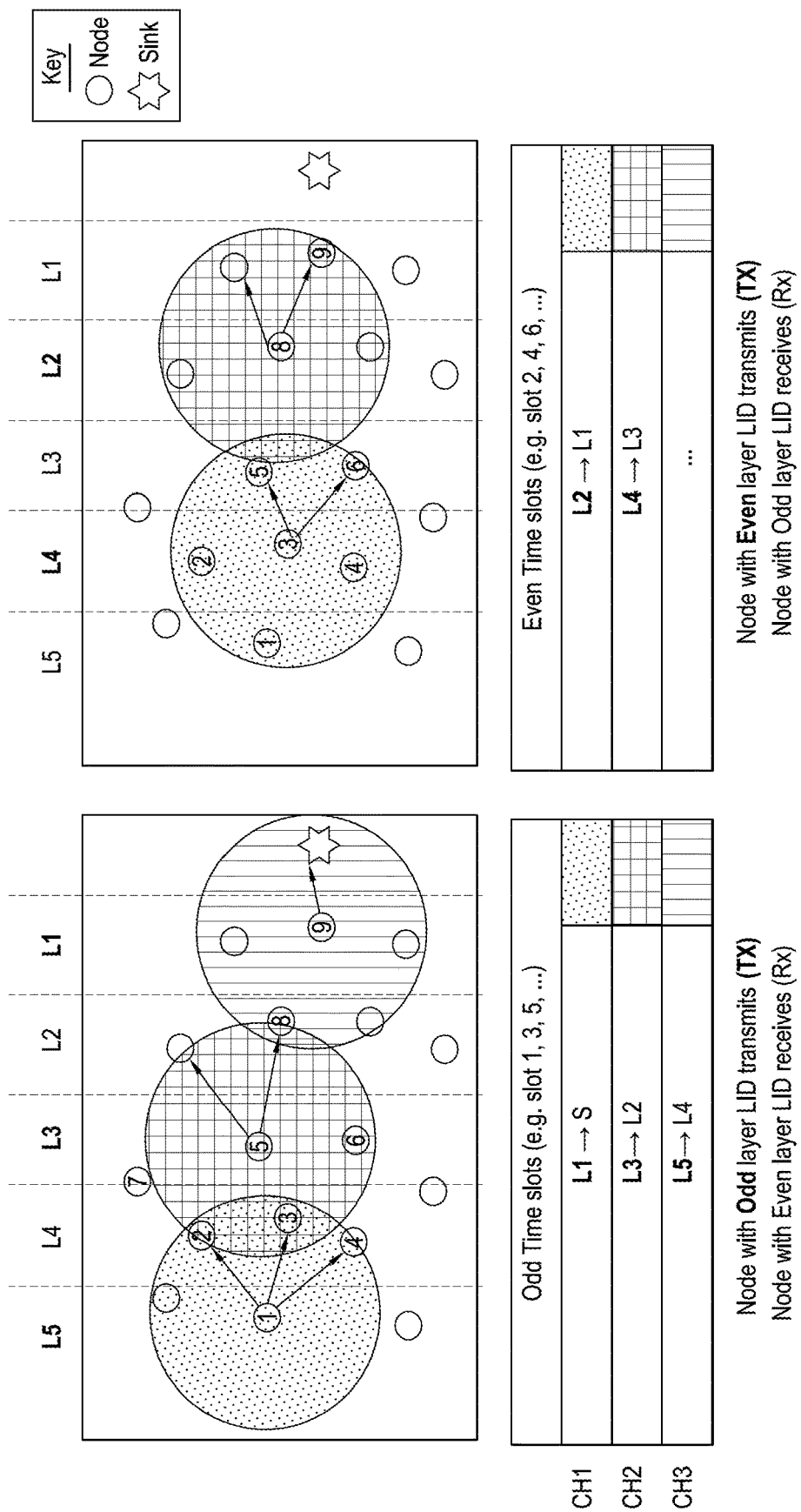
FIG. 8A shows transmissions during odd timeslots for the node topography of FIGS. 3 and 4.
FIG. 8B shows transmissions during even timeslots for the node topography of FIGS. 3 and 4.

In one arrangement, a layer based distributed scheduling mechanism for the TSCH MAC is proposed. The schedule decides whether a node should wake up and start to transmit or to receive a packet based on one single parameter—the Layer ID (LID). As depicted in FIGS. 8A and 8B, nodes with an odd LID will wake up and attend contention to transmit during odd timeslots in a TSCH slotframe, while they listen and receive packets during even timeslots. Equally, nodes occupying even layers will be scheduled to contend for transmission during even timeslots and to listen to receive packets during odd timeslots. In an alternative arrangement, the timeslots are swapped around, with even layers transmitting during odd timeslots and odd layers transmitting during even timeslots.

FIG. 8A shows transmissions during odd timeslots for the node topography of FIGS. 3 and 4. FIG. 8B shows transmissions during even timeslots for the node topography of FIGS. 3 and 4.

The network is divided up into alternating even and odd layers based on the distance of the nodes in each layer from the sink. Layers with an odd layer ID are odd layers and layers with an even layer ID are even layers.

Equally, the timeslots within a slotframe are divided up into alternating odd and even timeslots based on the position of the timeslots within the slotframe.

FIG. 8A shows transmissions during odd timeslots. In the present arrangement the odd layers (Layers 5, 3 and 1) transmit during odd timeslots. Accordingly, odd timeslots are scheduled for transmission for all of the nodes in the odd layers. All of the nodes that have messages to transmit wake up during the odd timeslots and attempt to transmit, as discussed above. The nodes that win the transmission contention transmit to the nodes in the next layer down from their own layer. The nodes in the even layers listen for transmissions during the odd timeslots.

In the present scenario, Node 1 wins transmission contention in Layer 5 and transmits to Nodes 2, 3 and 4 in Layer 4. Equally, in Layer 3, Node 5 wins transmission contention over Node 6 and so transmits to the nodes in Layer 2 (including Node 8). In Layer 1, Node 9 wins transmission contention and transmits to the sink.

Depending on whether the network is operating in ACK mode or non-ACK mode, the nodes that receive the transmissions may compete to send an acknowledgement back to the senders of the received transmissions.

FIG. 8B shows transmissions during even timeslots. In this case, the nodes occupying even layers will compete for transmission whilst the nodes occupying odd layers will listen out for transmissions.

In the present scenario, Node 3, in Layer 4, wins transmission contention and transmits for Nodes 5 and 6 in Layer 3. Equally, in Layer 2, Node 8 wins transmission contention and transmits to the nearby nodes in Layer 1 (including Node 9).

It should be noted that FIGS. 8A and 8B show one set of transmissions across the network. Nodes that are outside the transmission range of the nodes discussed above may transmit simultaneously, if they occupy a layer that is scheduled for transmission during that timeslot. This is because they would be too far away from the above discussed transmitting nodes to detect these transmissions. This allows multiple transmission paths to be utilised through the network to increase the efficiency of the network.

In the present arrangement different channel offsets (colours) are used by neighbouring odd layers during their transmissions (and neighbouring even layers during their scheduled transmissions) to mitigate interference.

In FIG. 8A, the transmissions from Layer 1 to the sink are sent over a first channel (CH1), the transmissions from Layer 3 to Layer 2 are sent over a second channel (CH2) and the transmissions from Layer 5 to Layer 4 are sent over a third channel (CH3).

In FIG. 8B, the transmissions from Layer 2 to Layer 1 are sent over the first channel whilst the transmissions from Layer 4 to Layer 3 are sent over the second channel.

Nonetheless, spectrum reuse is possible if two layers are very far away from each other. Frequency hopping may be adopted, by changing the channels for each layer between slotframes, as discussed above with regard to FIG. 1. Once a channel offset has been decided, a mapping function is called to map the channel offset to the actual physical frequency.

Once a channel offset is set, a pseudorandom algorithm is used to calculate the actual channel for transmission in the slotframe; therefore, nodes with the same channel offset will operate in the same channel. Having said this, a different channel will be used in the next slotframe.

In the following, a mechanism for determining a channel offset is described.

Equation (3) can be used for the channel offset ($CH_{offset}$) calculation for transmission (Tx) and reception (Rx) during an odd timeslot, respectively:

$$\begin{cases} Tx: CH_{offset} = \left\lfloor \dfrac{LID}{2} \right\rfloor \% \ m + LID \ \%2 \\ Rx: CH_{offset} = \left\lfloor \dfrac{LID+1}{2} \right\rfloor \% \ m + (LID+1) \ \%2 \end{cases} \quad (3)$$

where m is the channel reuse factor, a % b represents a modulo b, the remainder from the division of a by b, and $\lfloor n \rfloor$ is floor(n) that returns the largest integer that is less than or equal to n.

The channel reuse factor is the number of channels that are used, or the number of odd (or the number of even) layers before a channel is reused. This is equal to half the maximum number of hops (layers) before a channel is reused, as neighbouring odd and even layers may use the same channel. For instance, if m=2, then a channel will be reused every two odd layers (or every two even layers). In the arrangement of FIGS. 8A and 8B, m=3 or larger (further channels may be used that are not shown).

Equation (4) can be used for the channel offset calculation for transmission (Tx) and reception (Rx) during an even timeslot, respectively:

$$\begin{cases} Tx: CH_{offset} = \left\lfloor \dfrac{LID-1}{2} \right\rfloor \% \ m + (LID-1) \ \%2 \\ Rx: CH_{offset} = \left\lfloor \dfrac{LID}{2} \right\rfloor \% \ m + (LID) \ \%2 \end{cases} \quad (4)$$

The following example applies the above equations to Node 2 from FIG. 8B. As three channels are utilised, the channel reuse factor, m, is equal to 3. Node 2 has a layer ID (LID) of 4. Since Node 2 has an even LID value, it is only scheduled to receive data during odd time slots; therefore according to (3), the channel offset for Node 2 for receiving is 2%3+5%2=3. Node 2 will be scheduled to transmit in even timeslots with channel offset calculated by (4) as: 1%3+3%2=2. Hence, Node 2 will contend for transmission with channel offset 2 during timeslots 2, 4, 6, . . . , etc. and it will wake up and listen to the channel with channel offset 3 during timeslots 1, 3, 5, . . . , etc.

Scheduling for Layer 1 Nodes (Last Hop to the Sink)

In contrast to the nodes in the other layers, the nodes in Layer 1 only have one receiver, the sink, rather than multiple potential receiving nodes. Hence, the hidden node problem could cause serious consequences such as high packet drop rate (i.e. due to collisions at the sink). Accordingly, one arrangement explicitly schedules communications between the Layer 1 nodes and the sink during odd time slots, while nodes in the other layers use the LID based even/odd slots mechanism proposed in the section before.

A low complexity greedy algorithm based on average traffic rate for Layer 1 nodes can be applied schedule the traffic. Since there is only one hop and only one receiver, the complexity of the scheduling algorithm is O(n), where n is the number of nodes with LID=1.

Figure 9:
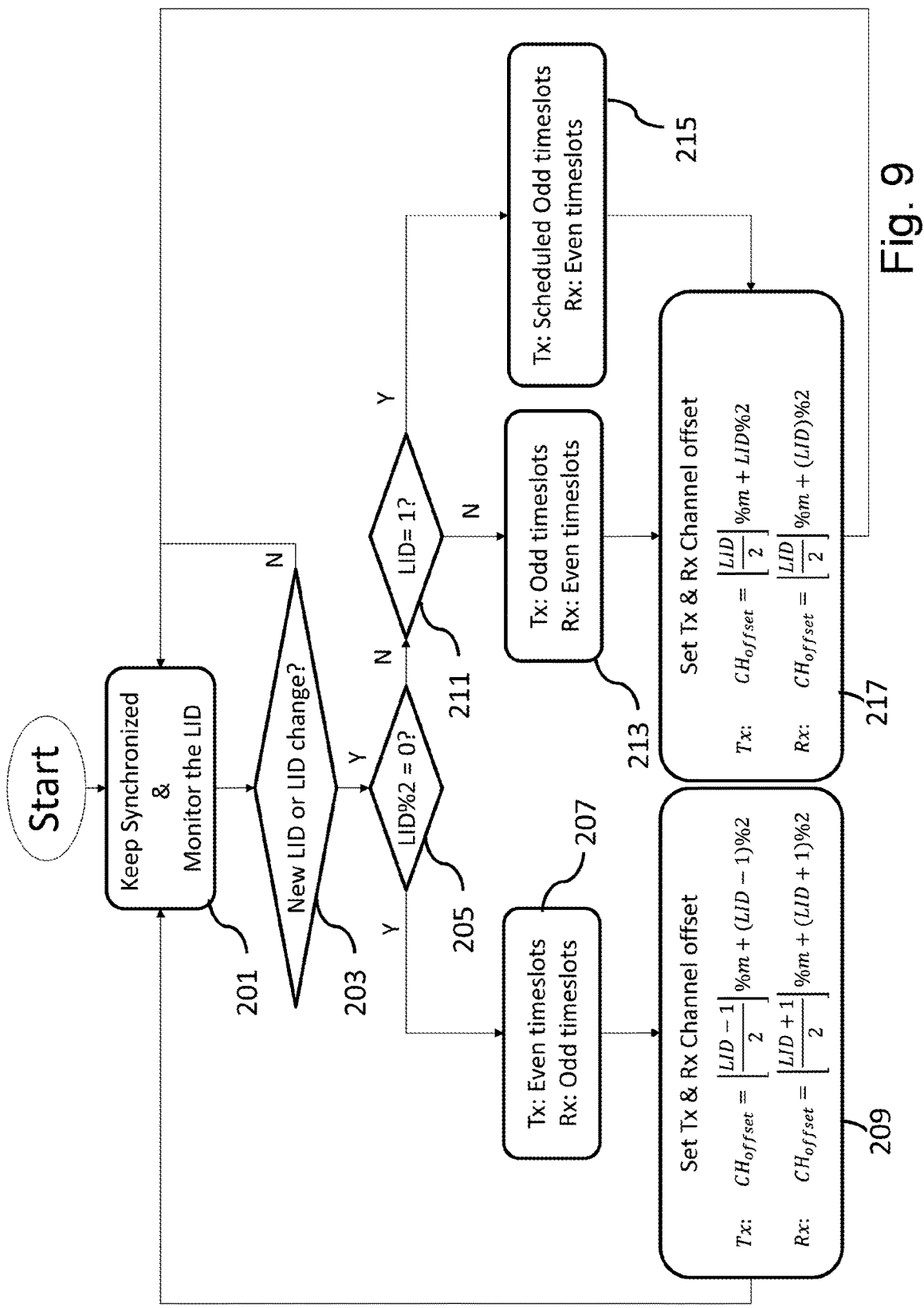
FIG. 9 shows a flowchart a method of allocating channel offsets for a given node.

FIG. 9 shows a flowchart a method of allocating channel offsets for a given node. The node begins by maintaining synchronisation with the network and monitoring its layer ID 201. The node determines its layer ID and checks whether the layer ID is new to it. This may be because the node has no prior associated layer ID (for instance, as the node is only just entering the network) or due to the layer ID changing as the node has moved into a different layer 203. If not, then the node loops back to step 201 to maintain synchronisation and continue to monitor the layer ID.

If the node determines that it occupies a new layer, the node updates its layer ID to reflect the new layer that it occupies. After this, the node determines whether it occupies an even layer 205 (i.e. whether LID % 2=0). If so, then the node schedules transmission attempts for even timeslots and reception attempts for odd timeslots 207. The node then calculates its channel offset for transmission according to the first equation of (4) (even transmission) and its channel offset for reception according to the second equation of (3) (odd reception).).

If the node occupies an odd layer (i.e. if LID % 2≠0) then the node determines whether it occupies the first layer 211 (i.e. whether LID=1). If not, then the node schedules opportunistic transmission attempts during odd timeslots and opportunistic receipt during even timeslots 213. If the node occupies the last layer, Layer 1, then the node schedules specific transmissions to the sink during odd timeslots and opportunistic receipt of transmissions during even timeslots. The scheduled transmissions to the node can be calculated centrally and assigned to the nodes in Layer 1 to avoid collisions at the sink. Once the timeslots for the node occupying the odd layer are scheduled 213, 215 (regardless of whether the node is occupying the last layer), the channel offsets are calculated 217 according to the first equation of (3) (odd transmission) and the second equation of (4) (even reception).

As mentioned previously, the assignment of even and odd layers to timeslots may be reversed. Accordingly, even layers may be assigned to transmit during odd timeslots and receive during even timeslots. The opposite would then apply to odd layers. The channel offsets would therefore be swapped over from those shown in FIG. 9, based on equations (3) and (4).

Silence Counter Based Duty Cycle Auto-Adjustment

With the proposed scheduling above, all nodes in the network wake up to either transmit or receive in every timeslot resulting a 100% duty cycle. This is not particularly energy efficient. If the traffic rate is known, then a simple solution could be to set a number, w, of timeslots in a slotframe to be active timeslots for according to the above scheduling approach, with the remaining timeslots in the slotframe being inactive timeslots during which the node can sleep/power down. Hence the ratio between the active timeslots and the total timeslots in a slotframe is effectively the duty cycle of the nodes. The number of active timeslots w can be determined by a central network entity such as the Path Computation Element (PCE) in 6TiSCH, or each node could determine w based on historical traffic information.

A dynamic duty cycling mechanism is proposed below. On the sender side, a node will only wake up and transmit in its scheduled Tx timeslot if there is a packet in its sending queue. For nodes that are scheduled to receive during odd or even timeslots, if a node hears a transmission during one timeslot, it will schedule the next timeslot for receiving to be an active timeslot. It will therefore wake up and attempt to receive packet in the next time slot scheduled for receipt. If there no transmission received in number a of consecutive receiving timeslots, the node will only wake after $\alpha*k$ scheduled timeslots for receipt, where k is a predetermined weight parameter. If the node receives a packet, then $\alpha$ is set back to the default value, which is usually zero.

When a new slot frame starts, a can be reset to its default value (e.g. zero) such that no packets will be missed initially; however, the node could also maintain the count a from the previous slotframe, if the energy efficiency is prioritised over transmission success rate.

Figure 10:
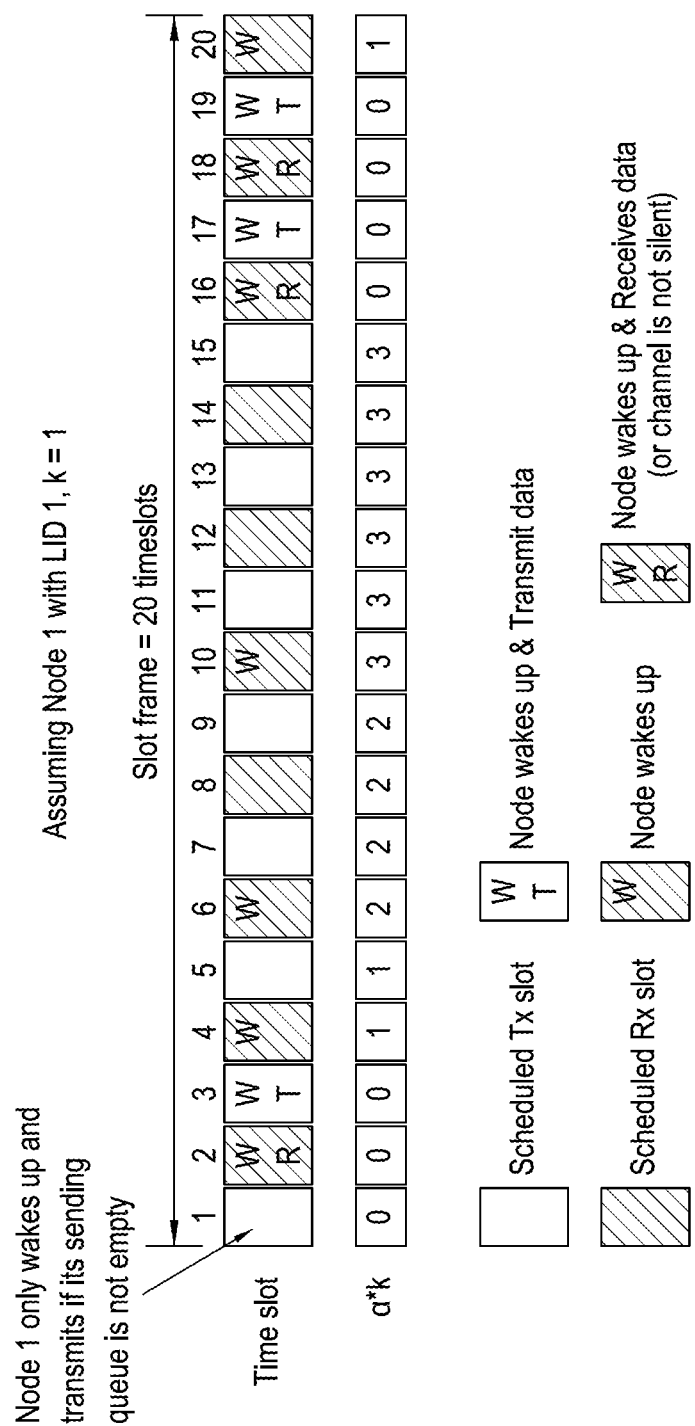
FIG. 10 shows an example of duty cycle auto-adjustment according to an arrangement.

FIG. 10 shows an example of duty cycle auto-adjustment according to an arrangement. The figure shows a slotframe with 20 timeslots for a given node (Node 1) occupying the first layer (LID=1). In the present arrangement, odd layers are scheduled to receive packets on even timeslots and the weight k is set to one (k=1). Accordingly, Node 1 should be scheduled to receive packets during timeslots 2, 4, 6, 8, 10, 12, 14, 16, 18 and 20. If the network is busy, then Node 1 will wake up and receive packets in the scheduled timeslots. However, if no packets are received during two consecutive listening timeslots (timeslots scheduled for the receipt of data), then the node will begin sleeping through listening timeslots to conserve energy.

In the present case Node 1 receives a packet during the second timeslot. It will therefore set its counter to zero ($\alpha$=0) and will schedule itself to wake up at the next scheduled reception timeslot. As the node now has a message in its queue for transmission, it will wake up at the next scheduled transmission timeslot (the third timeslot) and will forward the message on.

The node will then listen for transmissions during the fourth timeslot. In the present example, no packet is received during the fourth timeslot. Node 1 will therefore increment its counter by one, to set it to one ($\alpha$=1).

As only one empty receiving timeslot has been encountered, Node 1 will still wake up in the next scheduled listening timeslot (the sixth timeslot). If it receives a message during this timeslot then the counter will be reset to zero. In the present example, no packet is received in the sixth timeslot. Accordingly, the counter is increased by one to bring it to two ($\alpha$=2). As the node is configured to wake up at the $\alpha*/k^{th}$ next timeslot for receiving messages, the node will sleep through the next listening timeslot (the eighth timeslot) and wake up and the $2^{nd}$ next listening timeslot (the tenth timeslot).

In the present scenario, when Node 1 wakes up at timeslot 10 it still receives no packets. Accordingly, the counter is incremented once more and the node sleeps until timeslot 16 (the third next listening timeslot).

In the present example, Node 1 receives a packet at timeslot 16. The counter a is therefore set to the default value, zero. This causes the node to wake up and listen for packets during the next receiving timeslot, i.e. timeslot 18.

Figure 11:
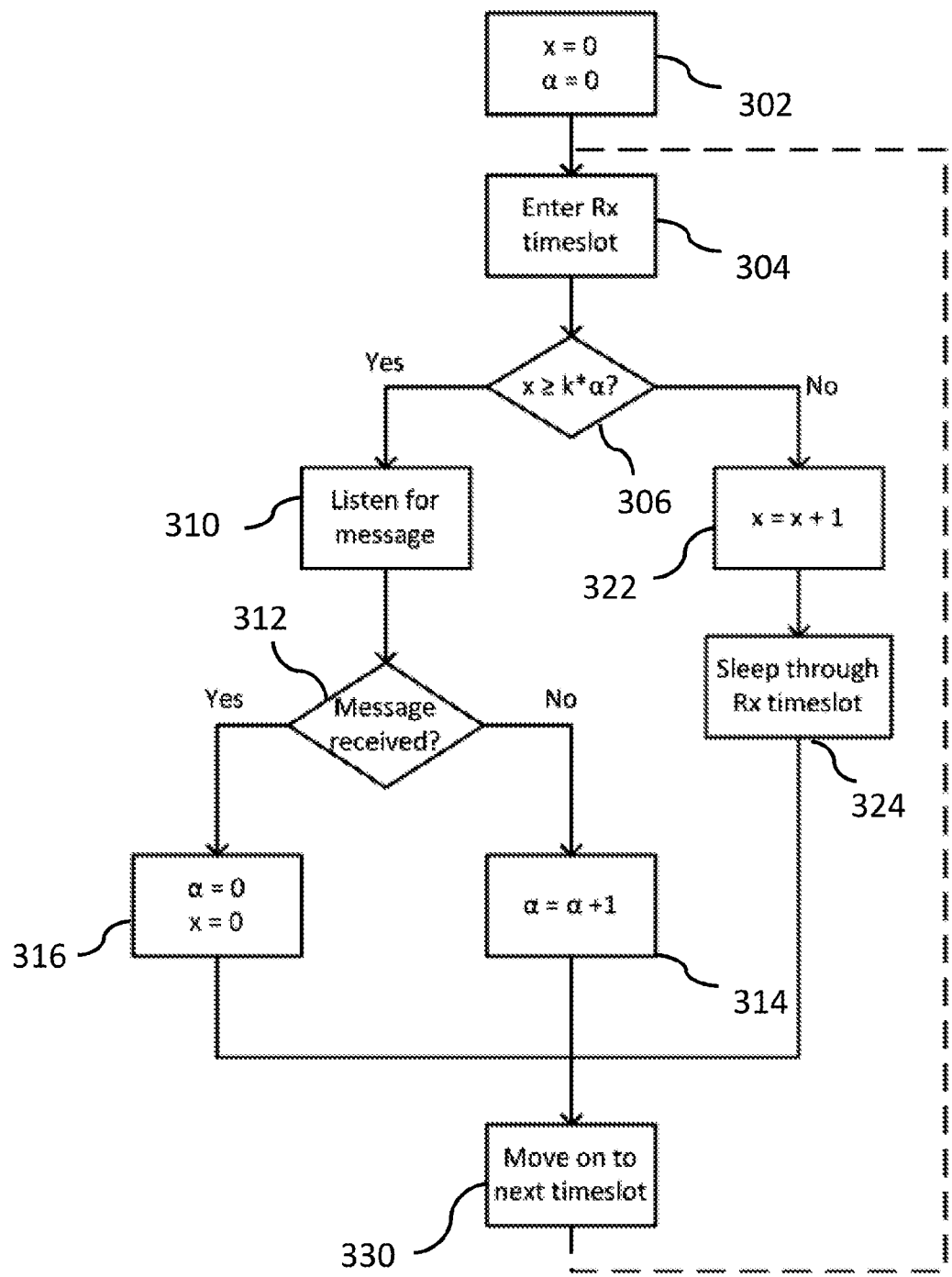
FIG. 11 shows a flow chart of duty cycle auto adjustment according to an arrangement.

FIG. 11 shows a flow chart of duty cycle auto adjustment according to the above arrangement. This method is implemented by a delay module in a processor in a node.

The delay module initially sets a delay counter a to a default value and a reception timeslot counter x to a default value 302. In the present arrangement, both default values are zero. When the node enters a reception timeslot 304 the delay module determines 306 whether the reception timeslot counter is greater than or equal to the delay counter a multiplied by a predefined weight k, i.e. whether $x \geq k*\alpha$. If so, then then the delay module determines that it should wake up for this reception timeslot. The delay module therefore listens for messages during the reception timeslot 310.

The delay module determines whether a message has been received 312. If so, then the delay counter and reception timeslot counter are reset to their default values 316. The delay module then waits for the next timeslot 330. In the meantime, the node may issue acknowledgement signals or perform other functions as described herein.

If no message is received then the delay counter is increased by one ($\alpha$ is set to $\alpha$+1) 314 and the delay counter waits for the next timeslot 330.

Once the next reception timeslot arrives then the method repeats itself from step 304 onwards.

If the reception timeslot counter is greater than or equal to $k*\alpha$, then the delay module determines that it has not yet reached its required delay. Accordingly, the delay module increases the reception timeslot counter by one (x is set to x+1) 322 and ensures that the node sleeps through the current reception timeslot 324. The delay module then waits for the next timeslot 330.

If the next timeslot is a transmission timeslot then the node will wake up and transmit if it has at least one message in its queue for transmission (not shown). Once the next reception timeslot arrives then the method repeats itself from step 304 onwards.

It should be noted that this FIG. 11 relates solely to the determination of when to wake up nodes during reception timeslots. The nodes may perform further actions during reception timeslots (for instance, sending acknowledgements); however, for clarity, this is not shown.

Other similar methods could also be used, for example, each node could generate a random number between 1 and 100 and compare it with a predefined threshold $\beta$. If the random number is less than $\beta$, then the node wakes up and listens during the reception timeslot. Otherwise, the node is powered down during the reception timeslot and waits for the next scheduled reception timeslot. $\beta$ effectively represents the percentage ($\beta$%) of nodes that wake up during any given reception timeslot. It can therefore be considered the probability of a given node waking up to listen during a given reception timeslot.

In once arrangement, the value of $\beta$ is reduced if no transmission is heard during a reception timeslot. This means that the probability of a node waking up during a reception timeslot may be decreased over time if no transmissions are detected in order to reduce unnecessary overhearing. If a packet is received then the threshold value $\beta$ can be set back to a default value (e.g. 100). A larger value of $\beta$ can increase of the number of receivers that wake up during each reception timeslot, which can increase the chance of a successful transmission but can reduce efficiency.

Nodes

Figure 12:
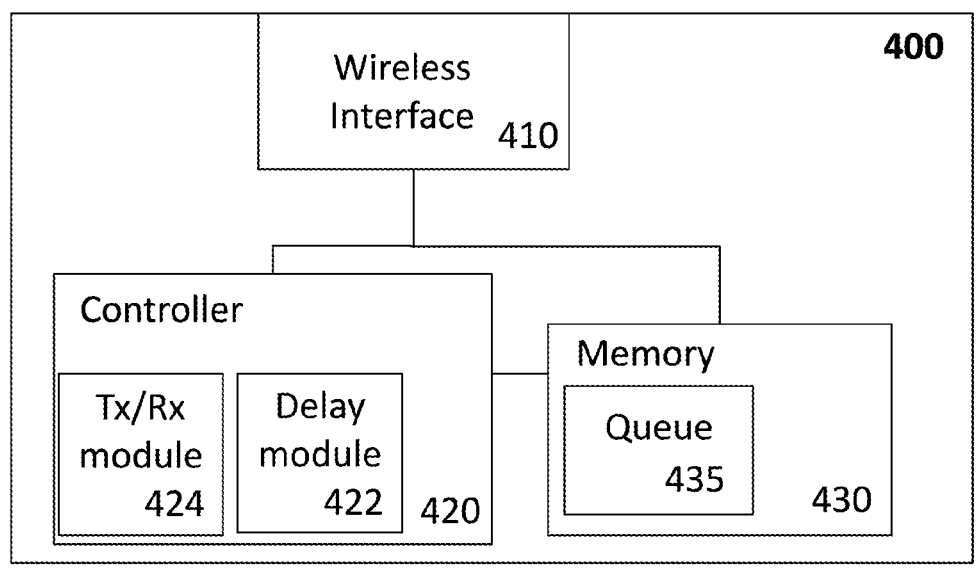
FIG. 12 shows a node according to an arrangement.

FIG. 12 shows a node according to an arrangement. The node is a wireless device configured to connect to other nodes in a multihop wireless network. The node 400 comprises a wireless interface 410, a controller 420 and memory 430.

The wireless interface 410 is configured to send and receive wireless signals to communicate with other wireless nodes. The controller 420 is configured to control the wireless interface 410 to transmit and receive data according to the methods described herein.

The memory 430 stores computer executable code which, when executed by the controller 420, causes the controller 420 to enact the steps described herein to transmit, receive and process data. The memory 430 comprises a transmission queue 435 for storing messages for transmission.

The controller 420 comprises a delay module 422 and a transmission (Tx) and reception (Rx) module 424. The Tx/Rx module 424 is configured schedule timeslots to transmit (transmission timeslots) and timeslots for listening for data (reception timeslots) based on the level of the network that the node 200 occupies. The Tx/Rx module is also configured to attempt to transmit, via the wireless interface 410, the next message in the queue of messages during transmission timeslots and to listen for transmissions during reception timeslots as discussed herein. The delay module 422 is configured to issue instructions to power down the Tx/Rx module for certain timeslots as discussed herein with regard to duty cycle adjustment.

The queue 435 may be a buffer of memory. The queue 435 may be either volatile or non-volatile memory. In one arrangement, the delay module 422 and Tx/Rx module 424 are incorporated into a single module.

Figure 13:
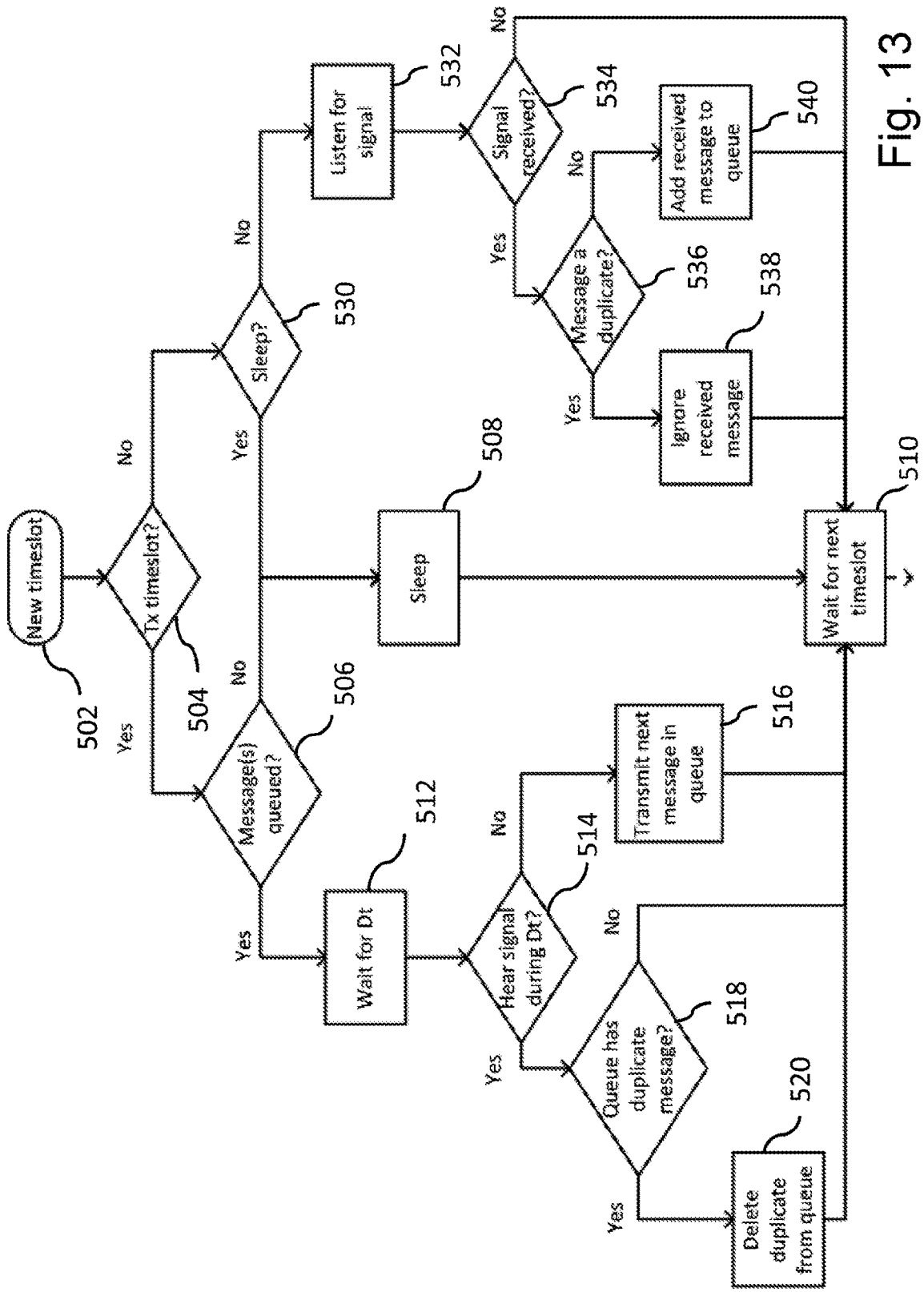
FIG. 13 shows a method of scheduling the transmission and reception of data according to an arrangement.

FIG. 13 shows a method of scheduling the transmission and reception of data according to an arrangement. The method may be implemented by the Rx/Tx module 424 of a node 400. The method shown is according to the non-ACK mode. The process for ACK mode will be described later.

The method begins when a new timeslot starts 502. The node then determines whether the timeslot is a transmission timeslot 504. If so, then the node determines if there are any messages queued for transmission 506. If not then the node sleeps 508 for the timeslot to conserve energy and waits for the next timeslot 510, at which point the node begins again from step 502.

If the queue does contain messages for transmission, then the node begins transmission contention. During this, the node determines a transmission delay Dt and waits for Dt 512. The node listens for any transmissions during this time 514. If the node does not overhear a transmission before the end of the transmission delay Dt is reached then the node transmits the next message in the queue 516 to nodes in the next layer. Once transmitted, the message is removed from the queue.

Each time a message is transmitted, the node stores a copy of the message (or an identifier of the message such as a unique message ID) in memory for a period of time to allow the node to check received messages to see if they are duplicates. After this period has expired, the message (or message identifier) is deleted from memory.

If a transmission is overheard during Dt then the node determines if the message contained in the transmission matches any of the messages that are currently queued for transmission 518. If no duplicate message exists in the queue, then the node waits for the next timeslot 510. If a duplicate message is present in the queue then the node deletes the duplicate from the queue 520 to avoid the duplicate messages being propagated through the network. The node then waits for the next timeslot 510.

If the timeslot is not a transmission timeslot then the node determines that the timeslot is a reception timeslot. The node then determines whether the reception timeslot is one during which the node is scheduled to sleep 530 (e.g. by the delay module in light of previous empty reception timeslots). If the node is due to sleep, then the node sleeps for the duration of the timeslot 508. The node then waits for the next timeslot 510.

If the node is not scheduled to sleep through the reception timeslot then the node listens for a signal during the reception timeslot 532. The node determines whether a signal is received 534. If no signal is received then the node waits for the next timeslot 510. At this point, the delay module may increment the delay counter, as discussed above.

If a signal is received during the reception timeslot then the node determines whether the message contained in the signal has previously been sent by the node 536. To this end the node checks its list of previously transmitted messages. If the list indicates that the received message has previously been transmitted (the list contains a duplicate of the received message, or the same message ID) then the node ignores the received message 538 and waits for the next timeslot 510. If the received message is not a duplicate then the node adds the received message to its queue for transmission 540 and then waits for the next timeslot.

The arrangement of FIG. 13 is for non-ACK mode with duty cycling. If duty cycling is not implemented, then step 530 is omitted, with the node going straight to listening for a signal 532 once it has determined that the timeslot is a reception timeslot. If ACK mode is being implemented, then additional steps are implemented after step 536, as shown in FIG. 14.

Figure 14:
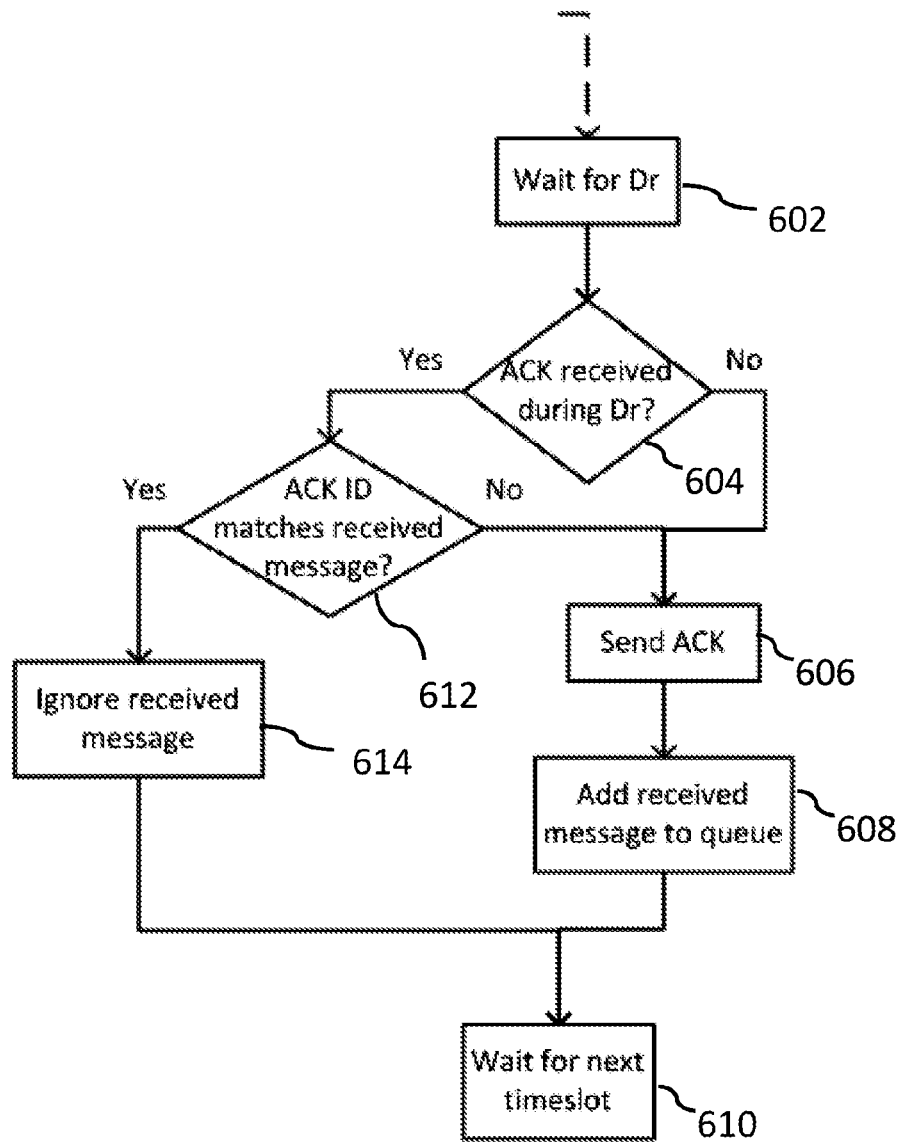
FIG. 14 shows a flowchart for acknowledgement contention (ACK mode) according to an arrangement.

FIG. 14 shows a flowchart for acknowledgement contention (ACK mode) according to an arrangement. This method replaces step 540 in FIG. 13. The method begins when the node determines that a received message is not a duplicate of a previously sent message (from step 536 of FIG. 13). The node then generates a receiver delay Dr and waits for this period 602. The node determines whether an acknowledgement is overheard during Dr 604. If not, then the node sends an acknowledgement back to the original transmitter of the message 606.

The acknowledgement includes a unique message ID to allow the transmitter to identify that the acknowledgement relates to the sent message, and to allow nearby nodes to identify the acknowledgement and back off from duplicate transmissions if required. Once the acknowledgement has been sent, the node adds the received message it its queue for transmission 608 and waits for the next timeslot 610.

If an acknowledgement is overheard during Dr then the node determines whether the message ID contained in the acknowledgement identifies the message received by the node 612 (e.g. matches the message ID of the received message). If not, then the node proceeds to steps 606-610 to send the acknowledgement and add the message to its queue. If the message ID in the overheard acknowledgement identifies the message that was received by the node then the node ignores the received message 614 and waits for the next timeslot 610. Ignoring the received message can include taking no action regarding the received message or deleting any copy of the received message from memory within the node.

The process for the transmitting node is also altered during ACK mode. In this case, the transmitting node listens for an acknowledgement from one of the receiving nodes after transmitting the message. This is not shown in FIG. 13; however, this would occur between steps 516 and 510. If no acknowledgement has been received, then the transmitting node will maintain the message in its queue for transmission and will attempt to transmit the message again during the next transmission timeslot. After a predefined number of failed transmission attempts the message is removed from the queue. If an acknowledgement is received then the transmitting node removes the message from its queue.

Limited Node Mobility Support

Arrangements described herein provide a distributed scheduling mechanism for a multi hop network (e.g. a TSCH MAC network) that can adapt quickly and efficiently to changes in node topology and node failure. This is in contrast to centralised TSCH MAC scheduling methods that struggle to adapt to changes in node topology due to their strict determinism and the complexity of real-time routing and scheduling optimization. The improved scheduling is achieved herein by basing scheduling on one single parameter, the layer ID. This sole parameter determines whether a node should transmit (broadcast) or receive data. This simplicity makes it possible to adapt to node mobility or node failure.

As long as a node can be synchronized to the TSCH network, it only needs to monitor its LID value when it is mobile. If it moves from one Layer to the other, it simply switches the scheduled Tx and Rx timeslots and uses the corresponding channel offsets based on the LID (see equations (3) and (4)).

In one arrangement, to avoid collisions at the sink, the final layer before the sink (Layer 1) is scheduled centrally (e.g. by the sink). Any node that moves to Layer 1 therefore requests dedicated timeslots from the sink, which adapts the schedule to include the new node. This is achievable in a relatively short timeframe for Layer 1 due to the reduced complexity of scheduling for only a single layer with a limited number of nodes.

Prior to receiving a schedule for transmission from the sink, the node that joins Layer 1 may utilise carrier sensing during the scheduled timeslot for competing for transmission in Layer 1 (e.g. the odd timeslot), allowing the node to transmit if no other nodes in the layer are transmitting in that slot.

Hybrid Frame with ACK and Non-ACK Timeslots

Figure 15:
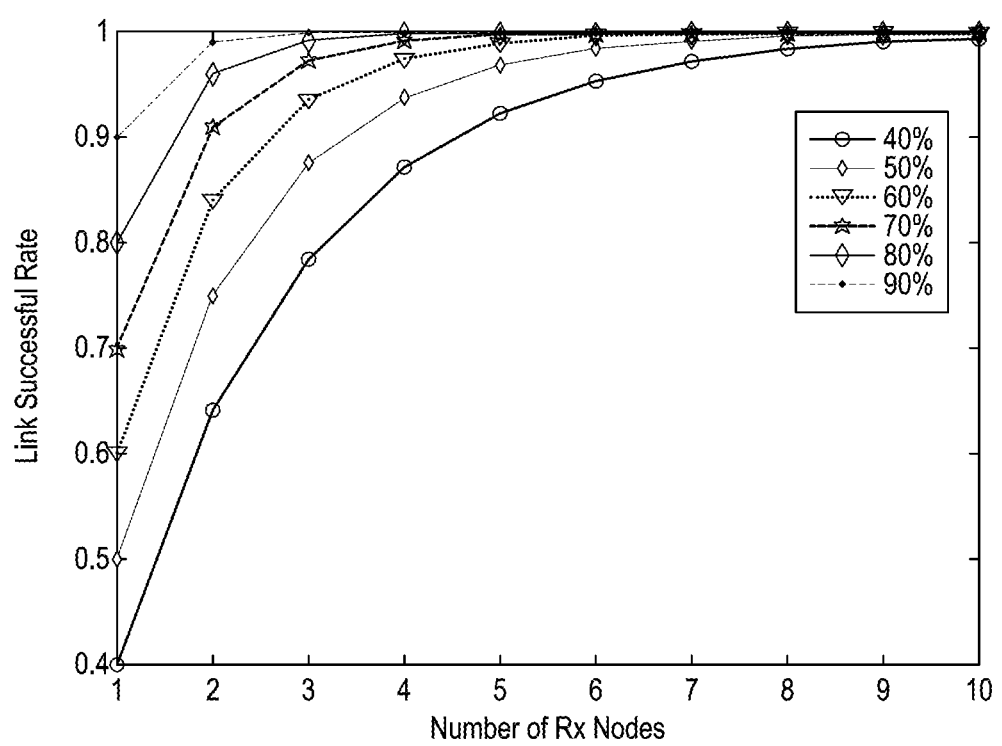
FIG. 15 shows the transmission success rate as a function of the number of receiver nodes available for reception (e.g. within transmission range)

FIG. 15 shows the transmission success rate as a function of the number of receiver nodes available for reception (e.g. within transmission range). This is plotted the scenarios in which the transmission success rate where only one receiving node exists is 40%, 50%, 60%, 70%, 80% and 90% respectively. When the number of available receiver nodes increases, the transmission success rate increases significantly thanks to spatial diversity. Having said this, there is usually only one sink in a mesh network. This results in a loss of spatial diversity on the last hop. For this reason, some arrangements implement ACK mode for transmissions from the last layer to the sink, even if non-ACK mode is used for other layers.

As the transmission success rate is dependent on the number of available nodes for reception, it is advisable to apply ACK mode for networks under a certain node density. Having said this, the additional signals required for acknowledging receipt can reduce the efficiency of the network. Accordingly, in one arrangement a hybrid ACK and non-ACK slotframe structure is utilised.

Ideally, only the last hop to the sink would need the ACK mode to guarantee the reliability. Having said this, to keep simplicity of the scheduling design, the hybrid slotframe implements ACK mode in odd time slots (slot 1, 3, 5, etc.) and non-ACK mode in even timeslots (slot 2, 4, . . . etc.). This provides a balance between improved packet delivery rate (ACK mode) and improved efficiency (non-ACK mode).

Figure 16:
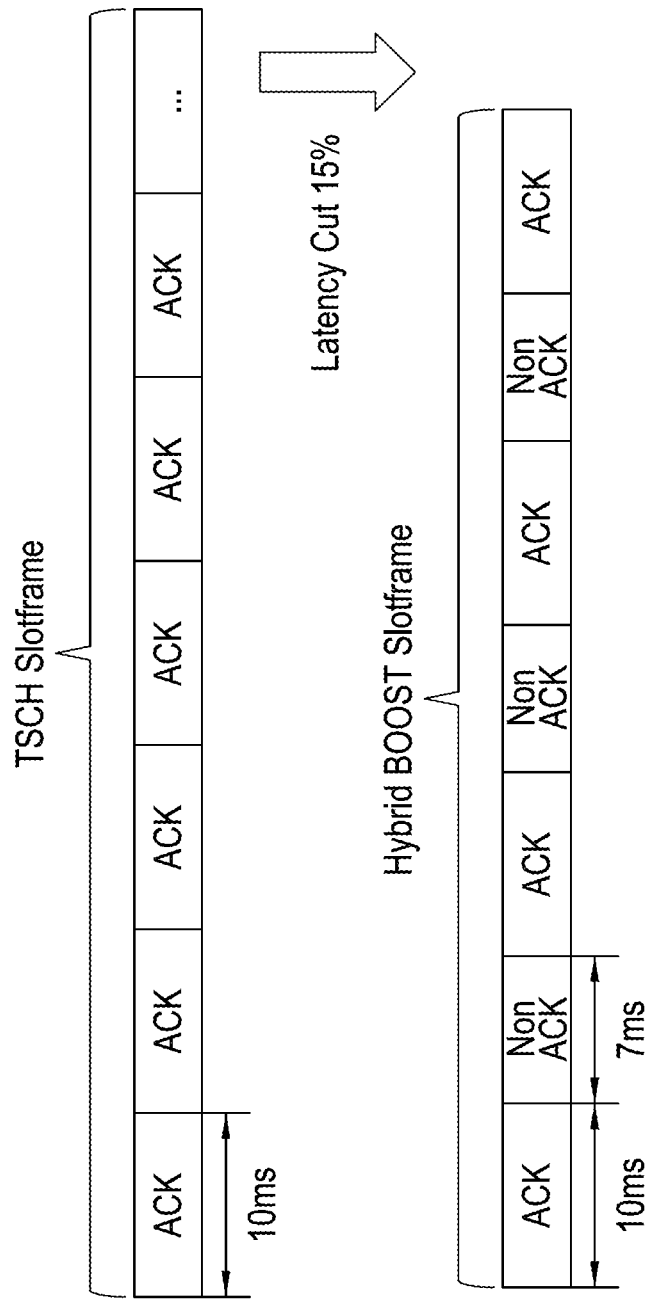
FIG. 16 shows a comparison between a TSCH slotframe and the proposed hybrid arrangement.

FIG. 16 shows a comparison between a TSCH slotframe and the proposed hybrid arrangement. As a timeslot including acknowledgements (ACK timeslot) is 10 ms long whilst a timeslot without acknowledgements (non-ACK timeslot) is only 7 ms long, the hybrid arrangement, which alternates between ACK and non-ACK, provides a reduction in latency of 15%. By extension, implementing non-ACK mode (100% non-ACK timeslots) would provide a 30% reduction in latency.

Network Performance

The proposed BOOST approach has been evaluated via simulation and compared with the following two alternative solutions: (Traffic-Aware Scheduling Algorithm) TASA+ TSCH; and an adaptive multi-hop scheduling (AMUS) method+TSCH. In the simulations, nodes were randomly distributed in a 50*150 m² area with a traffic rate set to one packet per node per slotframe. 200 timeslots were included in a slotframe, making the slotframe length 2 seconds (each timeslot being 10 ms).

The computation time required to produce an optimized schedule was determined. This is a very important parameter to evaluate the network's adaptability to any network changes that may occur during its operation, including: routing path change (parent change in RPL); node traffic change; node failure events; and, node mobility. If any of these events takes place, the scheduler may have to re-compute a new schedule based on the new network conditions so that it can meet predefined reliability or latency requirements. A longer schedule computation time means a slower system response for network dynamicity adaptation. As a result, the performance of the network can be degraded or the whole network can fail for the period before the new schedule can be deployed.

As shown in Table 3, both TASA and AMUS required a considerable amount of time to compute an optimised schedule. In contrast, the scheduling processing in BOOST takes almost no time to switch to a new schedule thanks to its simplicity.

It should be noted that Table 3 only shows the computation time to produce the schedule. In addition to this time, the scheduler must usually receive and send signalling messages to collect the new network status and assign the new schedule, before and after the schedule computation phase, respectively. This signalling process could add a further delay in addition to the schedule computation time. In contrast, in the present arrangement, nodes need only monitor one single parameter, their LID, and autonomously adapt their schedules for any LID changes.

Figure 17A:
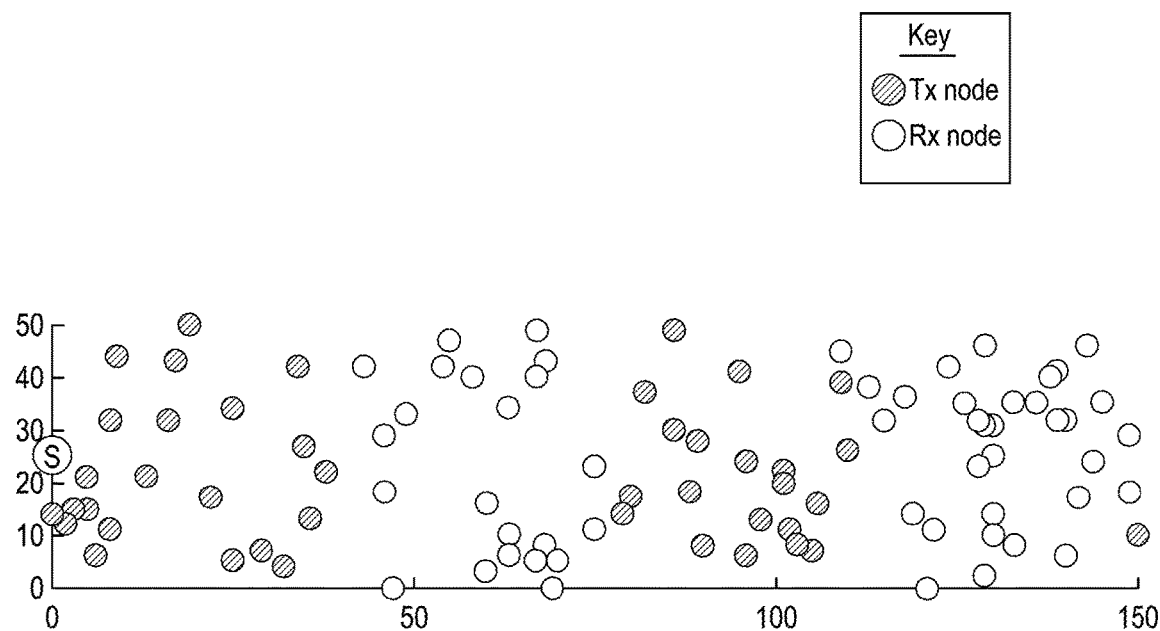
FIG. 17A shows an example of BOOST scheduling with nodes for even timeslots.
Figure 17B:
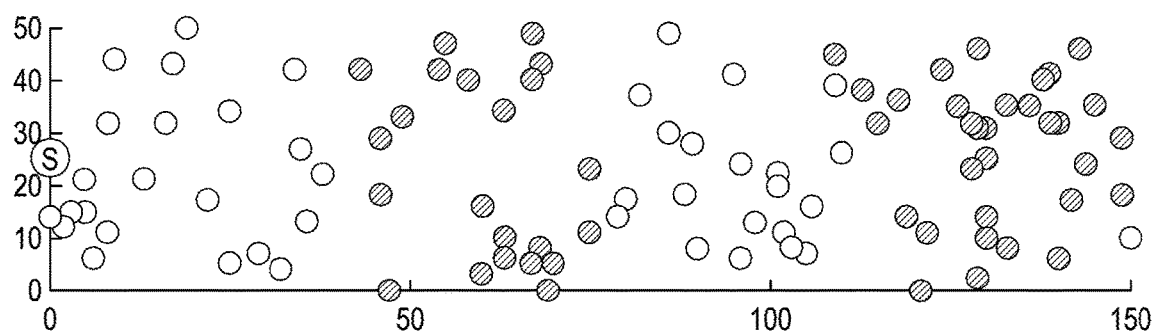
FIG. 17B shows an example of BOOST scheduling with nodes for odd timeslots.

FIG. 17A shows an example of BOOST scheduling with 100 nodes for even timeslots. FIG. 17B shows an example of BOOST scheduling with 100 nodes for odd timeslots. Shaded nodes are scheduled to transmit data and unshaded nodes are scheduled to receive data. The layers alternate between receiving and transmitting layers, with the receiving and transmitting layers swapping between even and odd timeslots.

TABLE 3

Comparison for Schedule Computation Time (Seconds) on an Intel I5-3570S 3.1 GHz * 2 MCU

| No. of Nodes | TASA | AMUS | BOOST |
| --- | --- | --- | --- |
| 10 | 0.071 | 1.301 | <0.001 |
| 20 | 0.209 | 7.47 | <0.001 |
| 40 | 0.961 | 14.426 | <0.001 |
| 60 | 1.863 | 25.99 | <0.001 |
| 80 | 3.156 | 37.54 | <0.001 |
| 100 | 4.513 | 59.43 | <0.001 |

Figure 18:
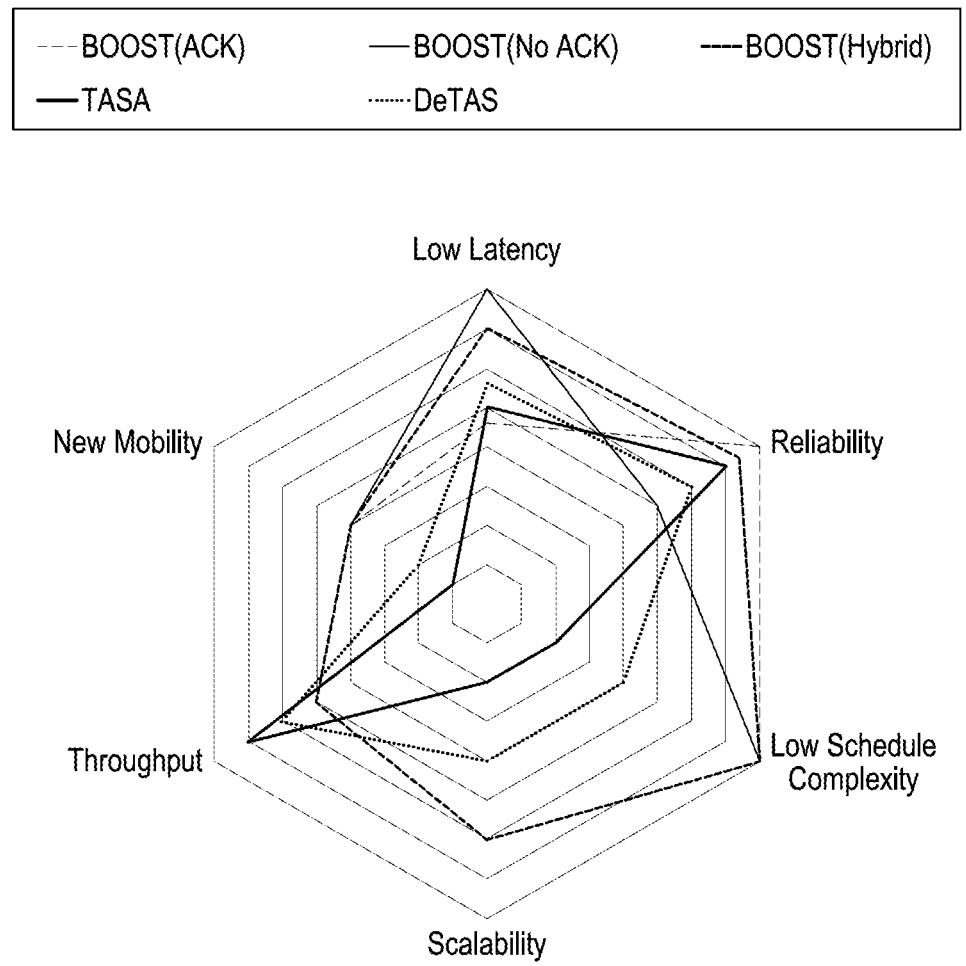
FIG. 18 shows a spider diagram for the varying performance characteristics of TASA, Decentralized Traffic Aware Scheduling (DeTAS), BOOST in ACK mode (BOOST (ACK)), BOOST in non-ACK mode (BOOST(No ACK)) and hybrid BOOST (BOOST(Hybrid))

FIG. 18 shows a spider diagram for the varying performance characteristics of TASA, Decentralized Traffic Aware Scheduling (DeTAS), BOOST in ACK mode (BOOST (ACK)), BOOST in non-ACK mode (BOOST(No ACK)) and hybrid BOOST (BOOST(Hybrid)). The three proposed BOOST arrangements exhibit greatly improved scalability, reliability and adaptability to node mobility, as well as greatly reduced schedule complexity. Whilst TASA and DeTAS exhibit better throughput and reduced latency, this is only for a static network. The performance of these systems degrades when schedules need to repeatedly recalculated due to node mobility and/or node failure.

The network performance was evaluated for TASA, AMUS, BOOST(ACK), BOOST(No ACK) and BOOST (Hybrid).

Figure 19A:
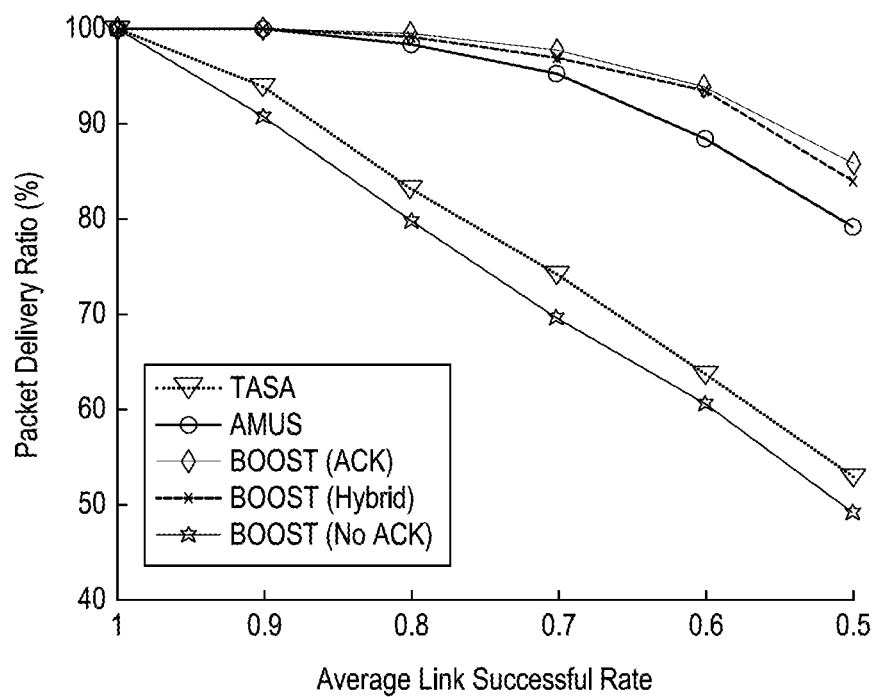
FIG. 19A shows network performance in terms of Packet Delivery Ratio (PDR) under different scheduling mechanisms.
Figure 19B:
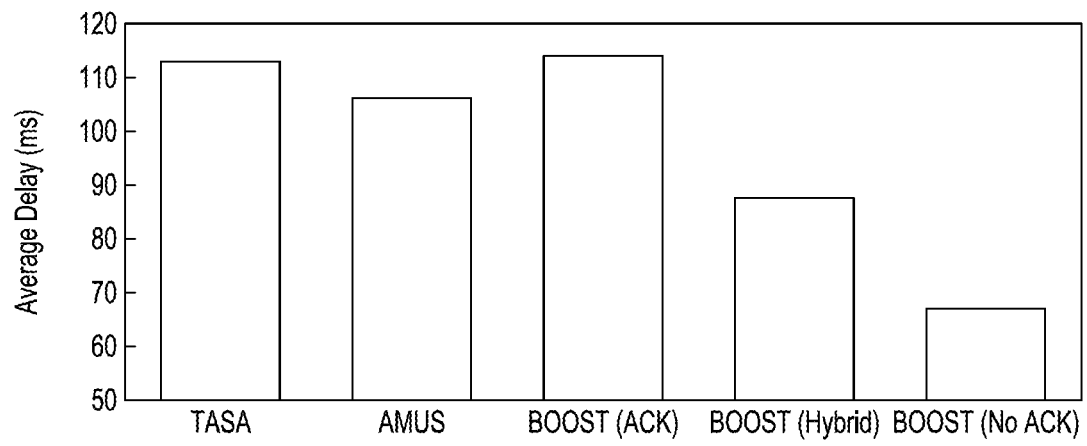
FIG. 19B shows network performance in terms of the average delay for rescheduling under different scheduling mechanisms.

FIG. 19A shows network performance in terms of Packet Delivery Ratio (PDR) under different scheduling mechanisms. FIG. 19B shows network performance in terms of the average delay for rescheduling under different scheduling mechanisms.

FIG. 19A shows the packet delivery ratio as a function of the average link success rate for the various scheduling mechanisms. The link success rate is the proportion of transmissions across communication link that a successful. The packet delivery ratio is the proportion of packets/messages that are successfully transmitted across the network to the sink. Each time a transmission fails this contributes to reducing the respective link success rate. The node will then attempt to retransmit. If after a predefined number of retransmissions communication is still not possible, then the message will be dropped. This will then contribute to reducing the packet delivery ratio.

The average link success rate ranges from 50%-100% (i.e. 50% chance of successful transmission to 100% chance). When the link success rate drops, the PDR of TASA and BOOST(No Ack) drop significantly. On the other hand, AMUS has a much smaller decrease in performance for such link quality drops thanks to its resource overprovision allocation scheme.

BOOST (ACK) and BOOST (Hybrid) have the best resilience against link quality degradation. Although the BOOST (ACK) solution performs the best in terms of PDR, the BOOST (Hybrid) approach offers a lower latency (FIG. 19B) while still retaining a good reliability level.

In the above simulations, a static network is assumed, where traffic is constant and tree topology is static once it has been formed. Network performance with node mobility was also assessed.

Figure 20A:
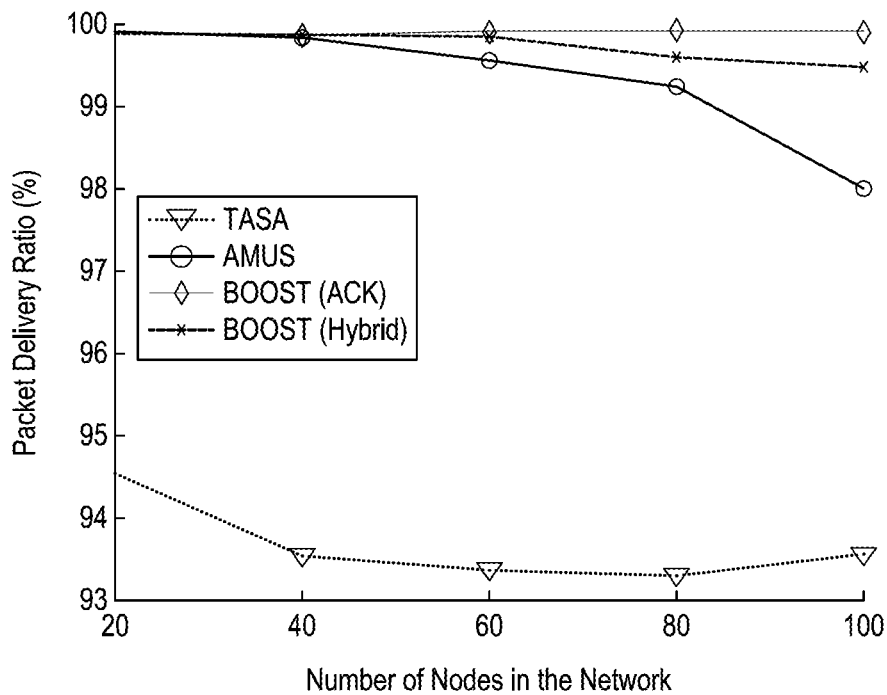
FIG. 20A shows the packet delivery ratio as a function of the number of nodes in the network for a static network.
Figure 20B:
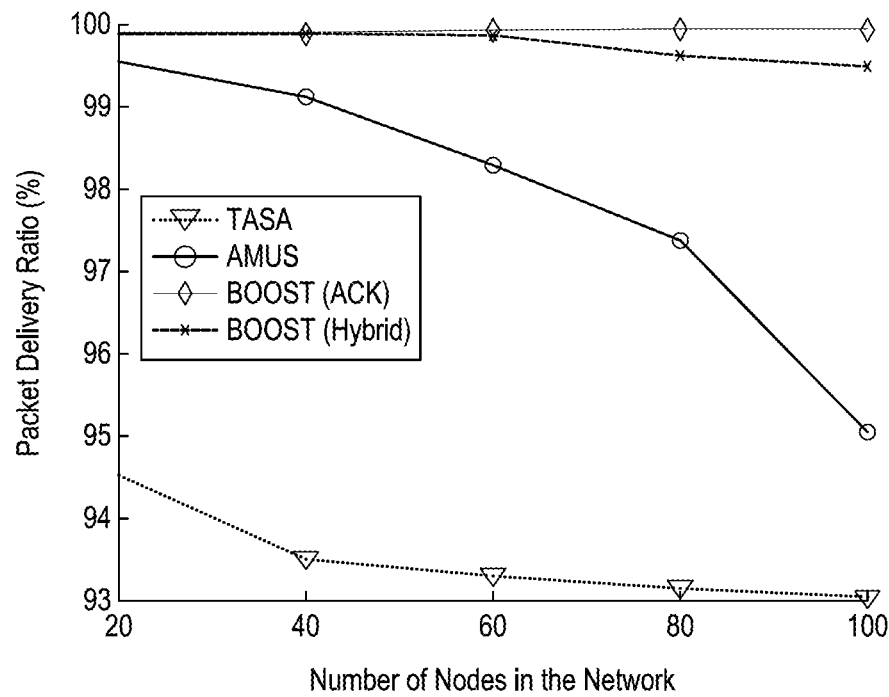
FIG. 20B shows the packet delivery ratio as a function of the number of nodes in the network for a network where 10% of nodes change their next hop routing nodes (switch their parent nodes) every 60 seconds.

FIG. 20A shows the packet delivery ratio as a function of the number of nodes in the network for a static network. FIG. 20B shows the packet delivery ratio as a function of the number of nodes in the network for a network where 10% of nodes change their next hop routing nodes (switch their parent nodes) every 60 seconds. It can be observed from FIG. 20B that the performance of AMUS in terms of PDR drops significantly due to the long rescheduling time (as shown in Table 3). When the number of nodes increases, the time required to compute a new schedule increases significantly. In addition, as the old schedule is not optimized for the period during which the new schedule is being computed, its performance also decreases when the number of nodes increases. On the other hand, the BOOST arrangements are not significantly affected by such changes, thanks to the efficient scheduling mechanism. For instance, BOOST (ACK) still maintains a 99.9% PDR up to 100 nodes.

Accordingly, the arrangements described herein provide an efficient distributed scheduling mechanism suitable for use in TSCH networking that is capable of adapting to changes in the routing topology. This allows the network to adapt effectively to moving nodes and/or node failure, without any significant drop in performance. By scheduling transmission and reception based on the layers of the network, each node can quickly and efficiently determine its channel and when to compete for access to the channel (for either transmission or reception of data). In addition, by scheduling specific timeslots for transmission or reception, the scheduling maintains determinism to ensure a given performance level. Such determinism is important for signalling systems, such as sensor or control systems, and is not possible for unscheduled opportunistic routing.

Whilst the above arrangements have odd layers transmitting during odd timeslots and receiving data during even timeslots, the opposite may apply, with odd layers transmitting during even timeslots and receiving data during odd timeslots.

In addition, whilst the above arrangements have been described with alternating reception and transmission timeslots, alternate slotframe structures may be used. For instance, each layer may transmit over two consecutive timeslots before receiving messages over two consecutive timeslots. Further combinations are possible, provided that the scheduling for each node is based on the layer ID of the node.

While certain arrangements have been described, the arrangements have been presented by way of example only, and are not intended to limit the scope of the inventions. Indeed, the novel methods and devices described herein may be embodied in a variety of other forms; furthermore, various omissions, substitutions and changes in the form of the methods and systems described herein may be made.

The invention claimed is:

1. A wireless device for wireless transmission over a multi-hop wireless network, the wireless network comprising nodes configured to forward messages towards a sink node, wherein the nodes are grouped in successive layers, each layer representing the distance of the nodes in the layer from the sink node, the wireless device comprising:
   a wireless interface for wirelessly communicating with nodes in the network; and
   a controller configured to:
      determine a schedule of timeslots for transmitting and timeslots for receiving messages based on which layer the wireless device occupies;
      receive, via the wireless interface and during a scheduled timeslot for receiving messages, a transmission from a first node, the transmission comprising a message;
      during the scheduled timeslot for receiving messages and in response to the receipt of the transmission:
         determine whether, during an acknowledgement contention period after receipt of the message, any signals are received via the wireless interface that indicate that an additional node has received the transmission; and
         in response to no signals being received, during the acknowledgement contention period, that indicate that an additional node has received the transmission, transmit to the first node, via the wireless interface, an acknowledgement of receipt of the transmission;
      add the message to a queue of messages for transmission by the wireless device;
      in response to a signal being received via the wireless interface indicating that another node in the network has received the message, remove the message from the queue of messages; and
      during a scheduled timeslot for transmitting messages:
         cause the wireless interface to transmit at least one message from the queue of messages for transmission to nodes in a layer closer to the sink than the wireless device;
         determine whether, during a transmission contention period, a further transmission is received via the wireless interface; and
         in response to a further transmission being received during the transmission contention period, inhibit transmission for the duration of the scheduled timeslot for transmitting messages.

2. The wireless device of claim 1 wherein the signal indicating that another node has received the message is a transmission from the other node comprising the message and/or an acknowledgement from the other node that the message has been received.

3. The wireless device of claim 1 wherein the acknowledgement contention period is based on one or more of a random value, the number of messages in the queue, a priority of a message in the queue, or a communication link quality.

4. The wireless device of claim 1 wherein the determination during the acknowledgement contention period and the transmission of the acknowledgement are in response to a determination of whether the device is located an odd or even number of layers away from the sink.

5. A wireless device according to claim 1 wherein the schedule comprises alternating timeslots for transmitting messages and timeslots for receiving messages.

6. A wireless device according to claim 1 wherein the schedule is based on whether the wireless device occupies a layer which is an odd or even number of layers away from the sink.

7. A wireless device according to claim 1 wherein the controller is configured to determine a channel for transmission and/or a channel reception based on which layer the wireless device occupies.

8. The wireless device of claim 7 wherein the controller is configured to set the channel for transmission based on a channel offset ($CH_{offset}$) calculated according to:

$$CH_{offset} = \left\lfloor \frac{LID}{2} \right\rfloor \% \ m + LID \ \%2 \ \text{or}$$

$$CH_{offset} = \left\lfloor \frac{LID-1}{2} \right\rfloor \% \ m + (LID-1) \ \%2$$

depending on whether the wireless device is located an odd or even number of layers away from the sink, wherein LID represents the layer that the wireless device occupies and m represents the number of channels being used by the network.

9. The wireless device of claim 7 wherein the controller is configured to set the channel for reception based on a channel offset ($CH_{offset}$) calculated according to:

$$CH_{offset} = \left\lfloor \frac{LID+1}{2} \right\rfloor \% \ m + (LID+1) \ \%2 \ \text{or}$$

$$CH_{offset} = \left\lfloor \frac{LID}{2} \right\rfloor \% \ m + (LID) \ \%2$$

depending on whether the wireless device is located an odd or even number of layers away from the sink, wherein LID represents the layer that the wireless device occupies and m represents the number of channels being used by the network.

10. The wireless device of claim 1 wherein the controller is configured to:
- store an indication of the message after transmission;
- compare a later received message to the indication of the message, to determine whether the later received message is a duplicate of the message;
- in response to determining that the later received message is a duplicate of the message, inhibit transmission of the later received message by the wireless device.

11. The wireless device of claim 1 wherein the controller is configured to:
- determine whether the wireless device occupies the last layer before the sink;
- in response to the wireless device occupying the last layer before the sink, request a last layer schedule from a central scheduler; and,
- in response to receiving the last layer schedule, communicate with the sink according to the last layer schedule.

12. The wireless device of claim 1 wherein the controller is configured to:
- in response to the wireless interface detecting no transmissions during two consecutive scheduled timeslots for receiving messages, powering down the wireless interface during the following n scheduled timeslots for receiving messages to conserve energy, wherein n is a positive integer.

13. The wireless device of claim 12 wherein the controller is configured to:
- in response to no transmission being received during a scheduled timeslot for receiving messages, increase the number of scheduled timeslots for receiving messages during which the wireless interface is powered down by k, wherein k is a positive integer.

14. The wireless device of claim 12 wherein the controller is configured to, in response to the wireless interface detecting a transmission during a scheduled timeslot for receiving messages, reset the number of scheduled timeslots for receiving messages during which the interface is powered down to a default value.

15. The wireless device of claim 1 wherein the controller is configured to:
- in response to the wireless interface detecting no transmissions during a scheduled timeslot for receiving messages, increase a probability of the wireless interface being powered down during a subsequent scheduled timeslot for receiving messages; and
- in response to the wireless interface detecting a transmission during a scheduled timeslot for receiving messages, decrease the probability of the wireless interface being powered down during subsequent timeslots receiving messages.

16. The wireless device of claim 1 wherein the controller is configured to, during a scheduled timeslot for transmitting messages, in response to the queue containing no messages, powering down the wireless interface for the duration of the scheduled timeslot for transmitting messages.

17. A multi-hop wireless network comprising a plurality of wireless devices according to claim 1.

18. The wireless device of claim 1 wherein the transmission contention period is based on one or more of a random number, a number of messages in the queue, a priority of the at least one message from the queue, or a communication link quality.

19. A method for managing a wireless device for wireless transmission over a multi-hop wireless network, the wireless network comprising nodes configured to forward messages towards a sink node, wherein the nodes are grouped in successive layers, each layer representing the distance of the nodes in the layer from the sink node, the wireless device comprising a wireless interface for wirelessly communicating with nodes in the network and a controller configured, the method comprising the controller:
- determining a schedule of timeslots for transmitting and timeslots for receiving messages based on which layer the wireless device occupies;
- receiving, via the wireless interface and during a scheduled timeslot for receiving messages, a transmission from a first node, the transmission comprising a message;
- during the scheduled timeslot for receiving messages and in response to the receipt of the transmission:
  - determining whether, during an acknowledgement contention period after receipt of the message, any signals are received via the wireless interface that indicate that an additional node has received the transmission; and
  - in response to no signals being received, during the acknowledgement contention period, indicating that an additional node has received the transmission, transmitting to the first node, via the wireless interface, an acknowledgement of receipt of the transmission;
- adding the message to a queue of messages for transmission by the wireless device;
- in response to a signal being received via the wireless interface indicating that another node in the network has received the message, removing the message from the queue of messages; and
- during a scheduled timeslot for transmitting messages:
  - causing the wireless interface to transmit at least one message from the queue of messages for transmission to nodes in a layer closer to the sink than the wireless device;
  - determining whether, during a transmission contention period, a further transmission is received via the wireless interface; and
  - in response to a further transmission being received during the transmission contention period, inhibiting transmission for the duration of the scheduled timeslot for transmitting messages.

20. A computer readable medium comprising instructions that, when executed by a processor, cause the processor to enact the method of claim 19.

* * * * *